US009618292B1

(12) United States Patent
Hancosky

(10) Patent No.: US 9,618,292 B1
(45) Date of Patent: *Apr. 11, 2017

(54) SHOOTING REST ADAPTED FOR MIMICKING HAND-HELD SHOOTING

(71) Applicant: Jack Hancosky, Avoca, NY (US)

(72) Inventor: Jack Hancosky, Avoca, NY (US)

(73) Assignee: Precision Accuracy Solutions, Inc., Webster, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/371,974

(22) Filed: Dec. 7, 2016

Related U.S. Application Data

(63) Continuation-in-part of application No. 15/168,618, filed on May 31, 2016, now Pat. No. 9,546,839.

(51) Int. Cl.
*F41A 23/16* (2006.01)
*F41A 25/00* (2006.01)
(Continued)

(52) U.S. Cl.
CPC ................ *F41A 25/00* (2013.01); *F16B 1/00* (2013.01); *F16M 11/041* (2013.01);
(Continued)

(58) Field of Classification Search
CPC .......... F41A 23/00; F41A 23/02; F41A 23/08; F41A 23/10; F41A 23/12; F41A 23/14;
(Continued)

(56) References Cited

U.S. PATENT DOCUMENTS 1,457,407 A * 6/1923 Stokes .................... F41A 23/16 89/37.04
2,003,327 A * 6/1935 Woodberry ............. F41A 23/12 89/40.06

(Continued)

FOREIGN PATENT DOCUMENTS

AU WO 2006086836 A1 * 8/2006 .............. F41A 23/16
DE 29918735 U1 * 5/2000 .............. F41A 23/16
FR GB 191502731 A * 12/1918 .............. F41A 23/02

OTHER PUBLICATIONS

Caldwell Shooting Supplies, The Lead Sled Dual Frame Technology, Assembly, Use and Care Instructions, Product # 336647, Instruction # 1007053 Rev G, 2501 LeMone Industrial Blvd., Columbia, MO 65201.

(Continued)

*Primary Examiner* — Benjamin P Lee
(74) *Attorney, Agent, or Firm* — Tracy Jong Law Firm; Tracy P. Jong; Cheng Ning Jong

(57) ABSTRACT

An apparatus for supporting a firearm having a forestock and a stock, the apparatus including at least two supports, each having an upper end portion and a lower end portion that is opposingly disposed from the upper end portion. A first and second support is configured to be removably attached at their respective upper end portion to the forestock and stock, respectively, of the firearm. Further disclosed is a base including at least one support receiver configured for removably engaging one of the first or second support at its lower end portion. Upon firing the firearm, recoil occurs without restriction as the removably engaged support disengages from the at least one support receiver and the firearm is returnable to the position prior to the firing of the firearm.

20 Claims, 16 Drawing Sheets

(51) Int. Cl.
*F16M 11/04* (2006.01)
*F16M 11/24* (2006.01)
*F16M 11/26* (2006.01)
*F16B 1/00* (2006.01)
*F41A 23/08* (2006.01)

(52) U.S. Cl.
CPC ............. *F16M 11/24* (2013.01); *F16M 11/26* (2013.01); *F41A 23/08* (2013.01); *F41A 23/16* (2013.01); *F16B 2001/0035* (2013.01)

(58) Field of Classification Search
CPC .......... F41A 23/16; F41A 23/18; F41A 23/52; F41A 23/56; F41A 25/00
See application file for complete search history.

(56) References Cited

U.S. PATENT DOCUMENTS

| | | | | | |
|---|---|---|---|---|---|
| 3,041,938 | A * | 7/1962 | Seabrook | F41A 23/16 | 42/94 |
| 3,358,504 | A * | 12/1967 | Freebairn | F41A 23/16 | 73/167 |
| 4,026,057 | A * | 5/1977 | Cady | F41A 23/16 | 42/94 |
| 4,333,385 | A * | 6/1982 | Culver | F41A 23/16 | 73/167 |
| 4,409,826 | A * | 10/1983 | Wenger | F41A 23/16 | 73/167 |
| 4,621,563 | A * | 11/1986 | Poiencot | F41A 23/16 | 73/167 |
| 4,702,029 | A * | 10/1987 | DeVaul | F41C 33/06 | 42/94 |
| 4,799,324 | A * | 1/1989 | Nodo | F41A 23/16 | 42/94 |
| 5,070,636 | A * | 12/1991 | Mueller | F41A 23/16 | 42/94 |
| 5,081,783 | A * | 1/1992 | Jarvis | F41A 23/16 | 42/94 |
| 5,497,575 | A * | 3/1996 | Fried | F41A 23/00 | 42/94 |
| 5,628,135 | A * | 5/1997 | Cady | F41A 23/16 | 42/94 |
| 5,811,720 | A * | 9/1998 | Quinnell | F41A 23/16 | 42/94 |
| 6,305,116 | B1 * | 10/2001 | Parker | F41A 23/04 | 42/94 |
| 6,860,055 | B1 * | 3/2005 | Walrath | F41A 23/16 | 211/64 |
| 8,096,077 | B1 * | 1/2012 | Caywood | F41A 23/005 | 224/150 |
| 8,109,028 | B2 * | 2/2012 | Roberts | F41A 23/16 | 42/94 |
| 8,307,576 | B1 * | 11/2012 | Bogart | F41A 23/16 | 248/176.1 |
| 8,549,786 | B1 * | 10/2013 | Griffith | F41A 23/14 | 42/94 |
| 8,931,193 | B1 * | 1/2015 | Bogart | F41A 23/16 | 248/163.1 |
| 9,121,665 | B2 * | 9/2015 | Hinds | F41A 23/04 | |
| 2001/0001912 | A1 * | 5/2001 | Weaver | F41A 23/02 | 42/94 |
| 2005/0188597 | A1 * | 9/2005 | Keng | F41A 23/08 | 42/94 |
| 2006/0230664 | A1 * | 10/2006 | Eddins | F41A 23/16 | 42/94 |
| 2007/0068379 | A1 * | 3/2007 | Sween | F41A 23/16 | 89/37.04 |
| 2009/0119967 | A1 * | 5/2009 | Hall | F41C 33/001 | 42/1.06 |
| 2009/0229160 | A1 * | 9/2009 | Elliott | F41A 23/04 | 42/73 |
| 2010/0236125 | A1 * | 9/2010 | Morrow | F41A 23/16 | 42/94 |
| 2011/0126444 | A1 * | 6/2011 | Keng | F41A 23/10 | 42/94 |
| 2011/0197748 | A1 * | 8/2011 | Roberts | F41A 25/04 | 89/37.04 |
| 2011/0247256 | A1 * | 10/2011 | Lickteig | F41A 23/06 | 42/94 |
| 2012/0186125 | A1 * | 7/2012 | Werner | F41A 23/18 | 42/94 |
| 2012/0285062 | A1 * | 11/2012 | Cama | F41A 23/16 | 42/1.06 |
| 2013/0086835 | A1 * | 4/2013 | Minneman | F41A 23/16 | 42/94 |
| 2014/0202057 | A1 * | 7/2014 | Witchel | F41A 23/02 | 42/1.06 |
| 2016/0116245 | A1 * | 4/2016 | Ravnaas | F41A 23/08 | 42/71.01 |

OTHER PUBLICATIONS

Caldwell Shooting Supplies, The Lead Sled, Instructions for Assembly and Use, Product # 820-216, 5885 W. Van Horn Tavern Rd., Columbia, MO 65203.
Caldwell Shooting Supplies, The Lead Sled Fire Control Xtreme, Assembly, Care and Usage Instructions, Product # 820-444, Instruction # 1011136, 5885 W. Van Horn Tavern Rd., Columbia, MO 65203.
Caldwell Shooting Supplies, The Lead Sled Plus, Assembly, Care and Usage Instructions, Product # 820-300, Instruction # 1005052, 5885 W. Van Horn Tavern Rd., Columbia, MO 65203.
Caldwell Shooting Supplies, The Lead Solo, Assembly & Usage Instructions, Instruction # 1006815, 5885 W. Van Horn Tavern Rd., Columbia, MO 65203.

* cited by examiner

SHOOTING REST ADAPTED FOR MIMICKING HAND-HELD SHOOTING

PRIORITY CLAIM AND RELATED APPLICATIONS

This continuation-in-part application claims the benefit of priority from application U.S. Ser. No. 15/168,618 filed on May 31, 2016. Said application is incorporated by reference in its entirety.

BACKGROUND OF THE INVENTION

1. The Field of the Invention

The present invention is directed generally to a shooting rest adaptable to a projectile device. More specifically, the present invention is directed to a shooting rest capable of being used in a manner where a weapon is held in hand and a shoulder stock, a buttstock, or simply a butt of the weapon is held against one's shoulder when firing the weapon.

2. Background Art

Numerous types of shooting rests have been attempted. A basic setup can include a pair of crossed tree branches for supporting a firearm, e.g. rifle or shotgun. Other attempts include the use of monopods, bipods, tripods, benches and "sleds," e.g., Caldwell® shooting sleds, Hyskore® rifle rests and may be referenced by these and other informal names. A shooting rest serves as relatively stable platforms upon which weapons can be supported with or without additional support aid rendered with another device or personnel, each having one or more drawbacks. Existing shooting sleds in the market, for instance, include cradles designed to support the stock of a weapon at its butt where the cradle is typically secured to a structure having sufficient weight such that during recoil, the cradle is capable of retaining the weapon while capable of reducing the impact a recoil generated on objects placed in line with the movement of the recoil or the shooter.

Among other problems, due to the means by which the recoil of the weapon is dampened, i.e., tied to the weight of a structure, the stock can impact the cradle at significant speed during recoil, causing significant damages (cracking) to the stock. Although the cradle may be lined with a soft material, any backbone or structural materials embedded in the cradle that are designed to provide sufficient stiffness to the cradle, can still be indirectly impacted during recoil. Most importantly, recoil of a weapon is stunted or arrested when the weapon is disposed on a conventional shooting rest. The weight of the sled prevents the natural tendency of the weapon to retract or recoil violently at high speed to counteract the forces associated with a departing bullet or shot of the weapon, causing the barrel of the weapon to oscillate just enough to direct the bullet or shots in an unintended direction, causing inaccuracies. In short, the unnatural recoil of the sled results in projectile flights that are different from those experienced by a natural shoulder hold. Further, most sleds are large in size or bulky, complicated in construction as they are assembled from many parts and heavy or cumbersome to transport. Another disadvantage of using an existing sled, e.g., Caldwell® shooting sled, lies in its inability to allow a shooter to hold the weapon against his shoulder as in the case of shooter-held shooting. Even when a shooting rest, many shooters prefer a realistic shooting posture as if a firearm is held in hands with the butt of the stock contacting the shooter's shoulder. By having a shooter absorb recoils, the requirement for a rest that is heavy enough to withstand recoils is lessened. Yet another disadvantage of using a sled, e.g., Caldwell®, lies in its inability to allow a weapon to be returned to a position identical to the position prior to a shot being taken. Therefore, with an existing sled, the shooting position is not repeatable, making it impossible for the shooter to create rapid successions of shots with high or even merely satisfactory accuracy.

Yet another disadvantage of using a sled, e.g., Caldwell®, lies in its inability to allow an aiming eye to be properly positioned in alignment with the longitudinal axis of a scope, without which, an accurate aim is nearly impossible. In conjunction with this inherent flaw is the problem created by the shooter's eye not being able to approach the precise distance from the ocular end of a scope that, in turn, establishes the focus clarity of the scope. This focal point is a very exact distance for which there is little or no error tolerance.

Thus, there is a need for a shooting rest which addresses all the shortcomings of the existing sleds.

SUMMARY OF THE INVENTION

In accordance with the present invention, there is provided an apparatus for supporting a firearm having a forestock, a stock and a central axis while allowing a recoil of the firearm to not be restricted and the firearm to be repeatably returned to the position the firearm was supported prior to the recoil, the apparatus comprising at least two supports, each having an upper end portion and a lower end portion that is opposingly disposed from the upper end portion, a base having a top surface having a profile, the base comprising at least one support receiver configured for removably engaging a support of the at least two supports at its lower end portion, wherein a first one of the at least two supports is configured to be removably coupled at its upper end portion to the forestock of the firearm and a second one of the at least two supports is configured to be removably coupled at its upper end portion to the stock of the firearm and the at least one support receiver comprises a channel having a width, the channel is disposed on the top surface substantially at right angle to the central axis of the firearm and the lower end portion of at least one of the at least two supports comprises a rounded structure to be removably coupled to the channel, the rounded structure having a diameter that is larger than the width of the channel, whereby upon firing of the firearm, recoil occurs without restriction as one of the at least two supports disengages from the at least one support receiver and slides according to the profile of the top surface and the firearm is returnable to the position prior to the firing of the firearm by re-engaging the support of the at least two supports with the at least one support receiver.

In accordance with the present invention, there is provided an apparatus for supporting a firearm having a forestock, a stock and a central axis while allowing a recoil of the firearm to not be restricted and the firearm to be repeatably returned to the position the firearm was supported prior to the recoil, the apparatus comprising at least two supports, each having an upper end portion and a lower end portion that is opposingly disposed from the upper end portion, a base having a top surface having a profile, the base comprising at least one support receiver configured for removably engaging a support of the at least two supports at its lower end portion, wherein a first one of the at least two supports is configured to be removably coupled at its upper end portion to the forestock of the firearm and a second one of the at least two supports is configured to be removably coupled at its upper end portion to the stock of the firearm, and the at least one support receiver comprises a channel having a width and a front end, the channel is terminated at the front end of the channel with a raised bar that is disposed substantially at right angle to the channel, the channel is disposed on the top surface and substantially parallel to the central axis of the firearm and the lower end portion of at least one of the at least two supports comprises a rounded structure configured to be removably coupled to the channel, the rounded structure having a diameter that is larger than the width of the channel, whereby upon firing of the firearm, recoil occurs without restriction as one of the at least two supports slides along the channel and the firearm is returnable to the position prior to the firing of the firearm by re-engaging the support of the at least two supports with the raised bar and the channel.

In one embodiment, each of the at least two supports is adapted for attachment at its upper end portion to the firearm via a rail-bracket mechanism of the Picatinny or Weaver type. The upper end portion of the first one of the at least two supports is adapted for attachment to the forestock of the firearm and the upper end portion of the second one of the at least two supports is adapted for attachment to the stock of the firearm.

In one embodiment, the invention further includes a secondary support having a plurality of height-adjustable legs extending from a bottom surface of the secondary support such that the base can be disposed atop a top surface of the secondary support that can be disposed at a desired height and pitch.

In one embodiment, the base further includes at least one aperture connecting the top surface and a bottom surface of the base, the at least one aperture is configured for allowing penetration of a stake that secures the apparatus to another surface below the bottom surface.

In one embodiment, each of the upper end portion of the two supports is adapted for attachment to the firearm via a quick-release mechanism, wherein the upper end portion of a support is adapted for attachment to the forestock of the firearm and the upper end portion of another support is adapted for attachment to the stock of the firearm.

In one embodiment, at least one of the at least two supports includes a pair of legs.

In one embodiment, each of the legs is configured to be telescopic.

In one embodiment, at least one of the two supports includes a pivot disposed at the upper end portion, the pivot having an axis of rotation disposed substantially at right angle to the central axis of the firearm such that a rotation of the at least one of the two supports causes a pitch change of the firearm.

In one embodiment, at least one of the two supports includes a pair of legs configured to be spread-adjustable such that the stance and height of the at least one of the two supports are adjustable while the roll angle of the pair of legs is maintained.

In one embodiment, the present apparatus further includes an elastic member having two ends, a first end of the elastic member is configured to be removably attached to the firearm and a second end of the elastic member is configured to be attached to the base, whereby the elastic member restricts the recoil of the firearm from going out-of-range. In one embodiment, the first end includes a magnetic material.

An object of the present invention is to provide a shooting rest that does not restrict the recoil action of a projectile device supported on the shooting rest.

Another object of the present invention is to provide a shooting rest that allows the shooting position of a projectile device to be repeatable.

Another object of the present invention is to provide a shooting rest that can be easily transported.

Another object of the present invention is to provide a shooting rest that can be adapted to support a plurality of projectile devices.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

Figure 6:
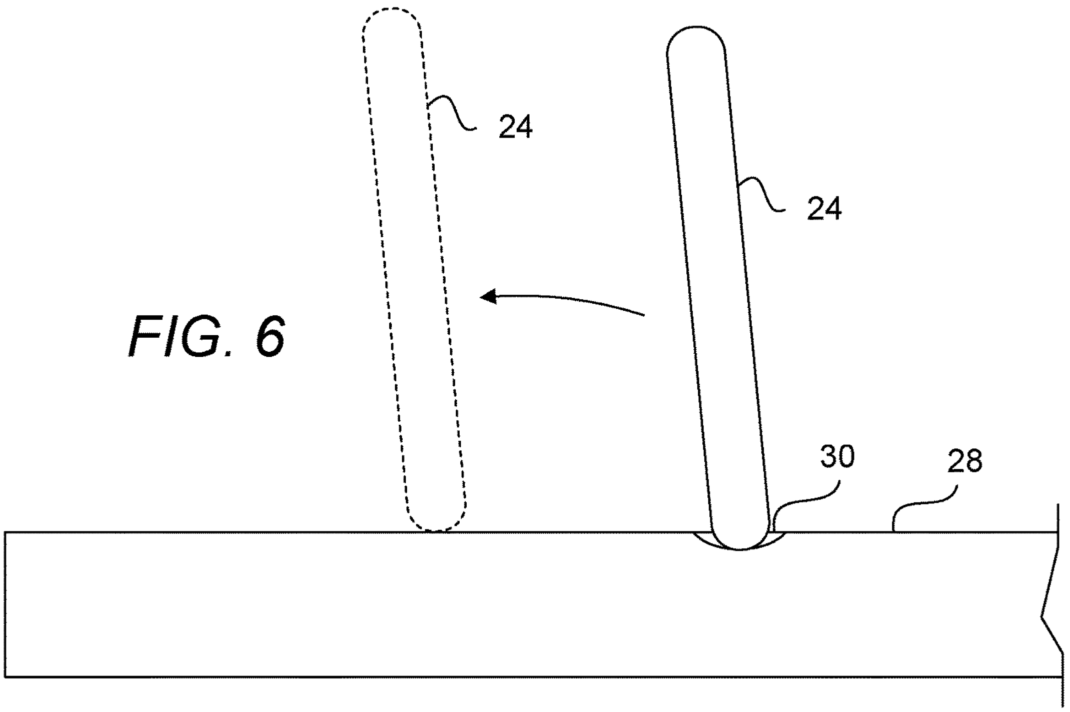
Figure 7:
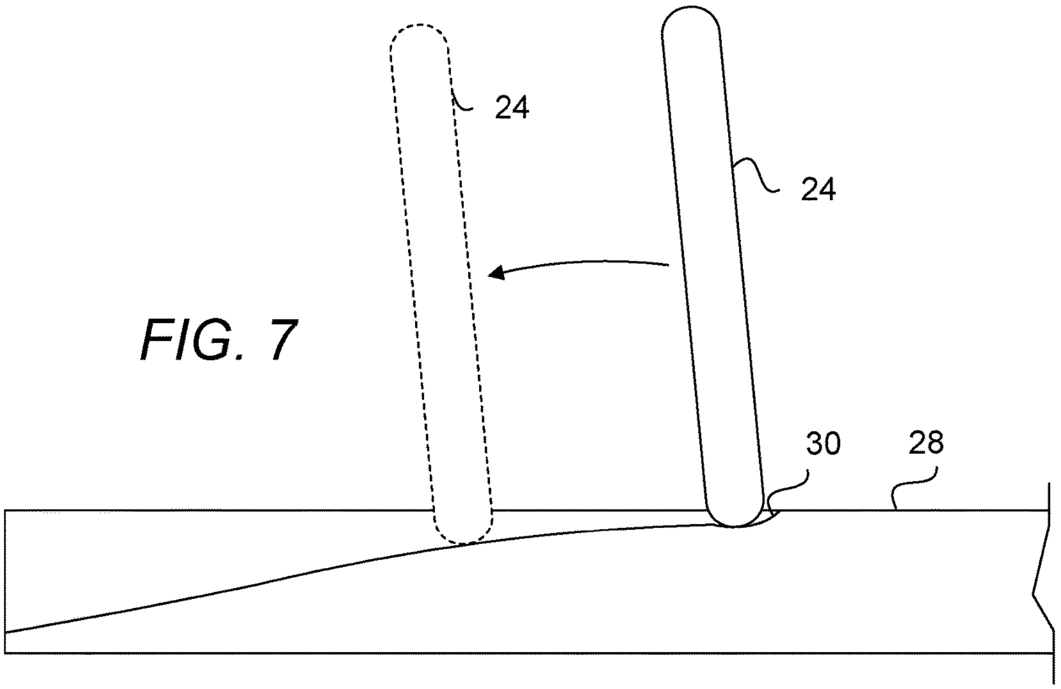
Figure 8:
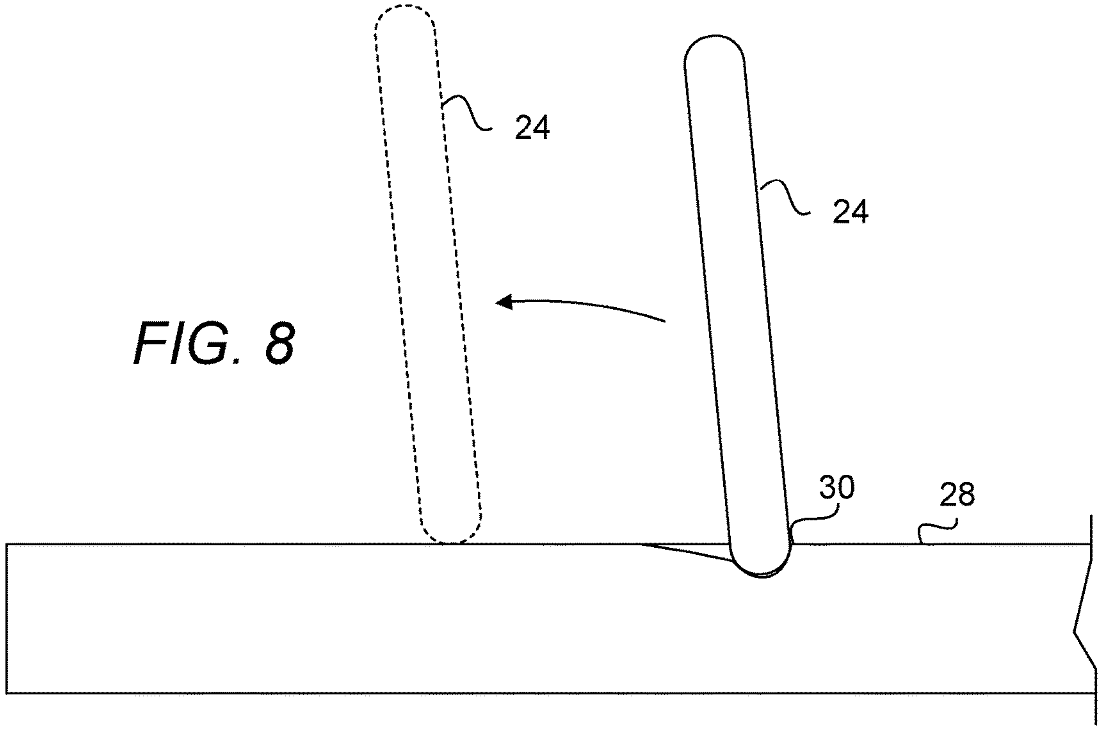

Each of FIGS. 6-8 is a side view of a leg of a support relative to a base upon which the leg of the support is supported, depicting a position of the leg prior to the firing of a projectile device coupled with a shooting rest and a position of the leg as a result of the firing of the projectile device.

Figure 9:
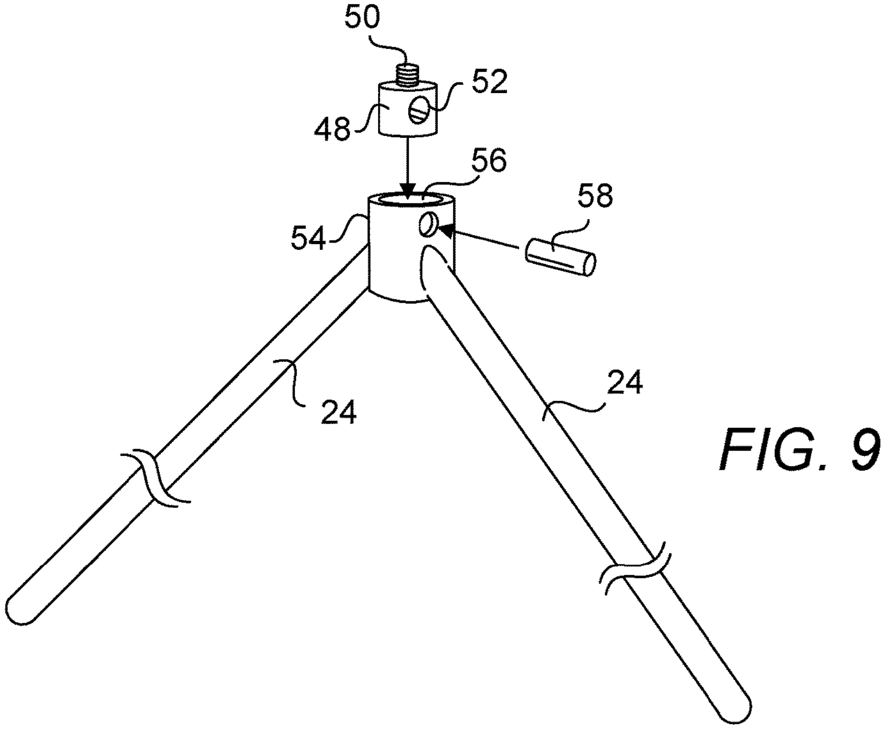

FIG. 9 depicts one embodiment of an adaptor suitable for securing one embodiment of the present shooting rest to a projectile device.

Figure 10:
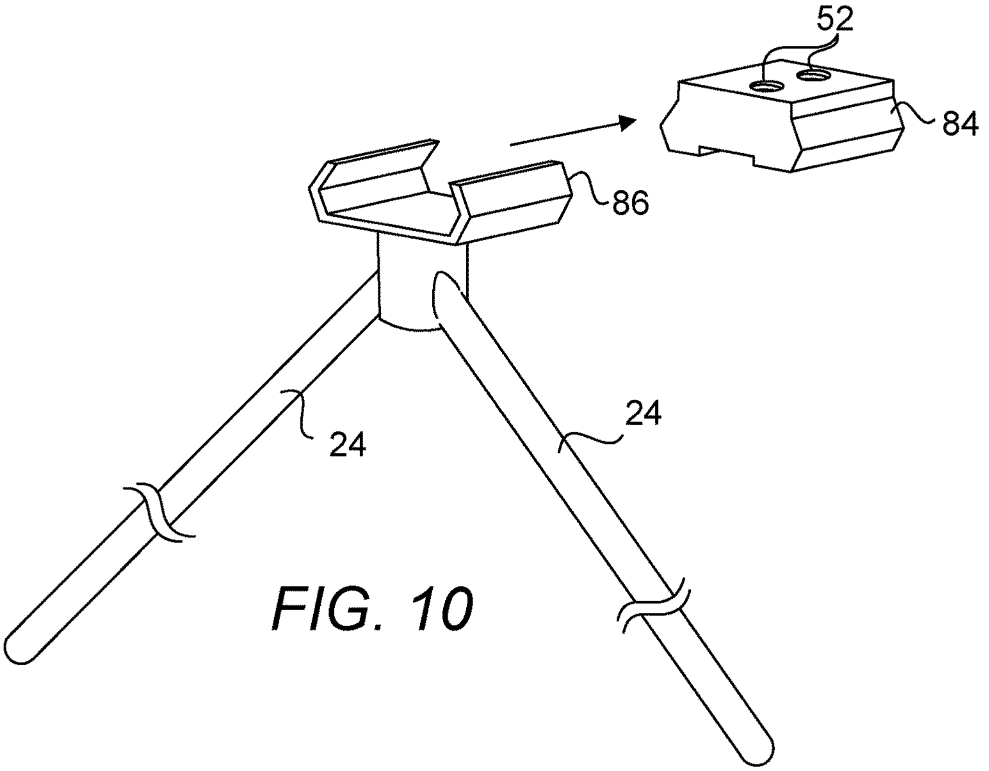

FIG. 10 depicts one embodiment of an adaptor suitable for securing one embodiment of the present shooting rest to a projectile device.

Figure 11:
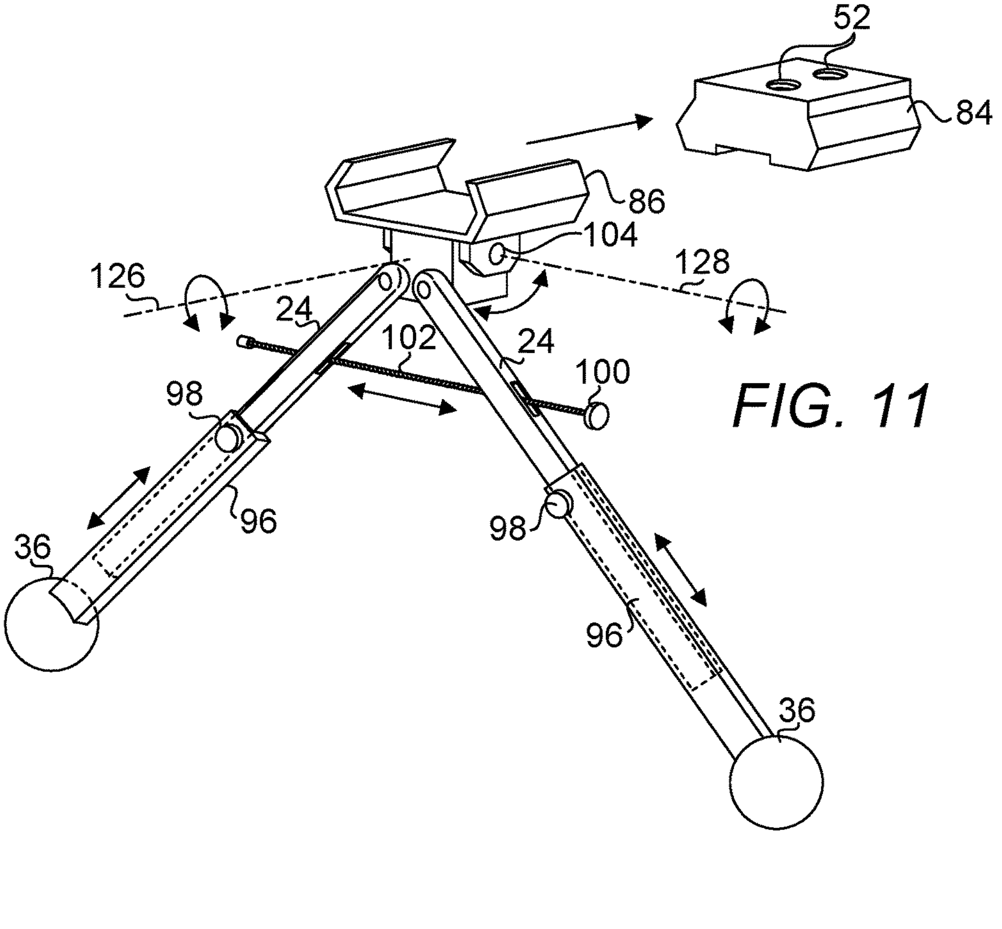

FIG. 11 depicts one embodiment of a support suitable for supporting a projectile device.

Figure 12:
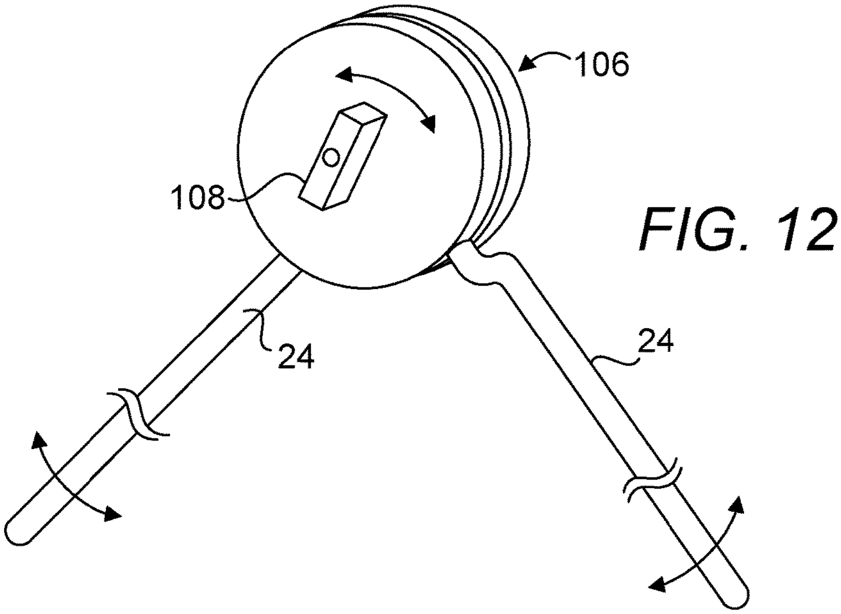

FIG. 12 depicts one embodiment of a support suitable for allowing adjustment of the spread of legs of the support.

Figure 13:
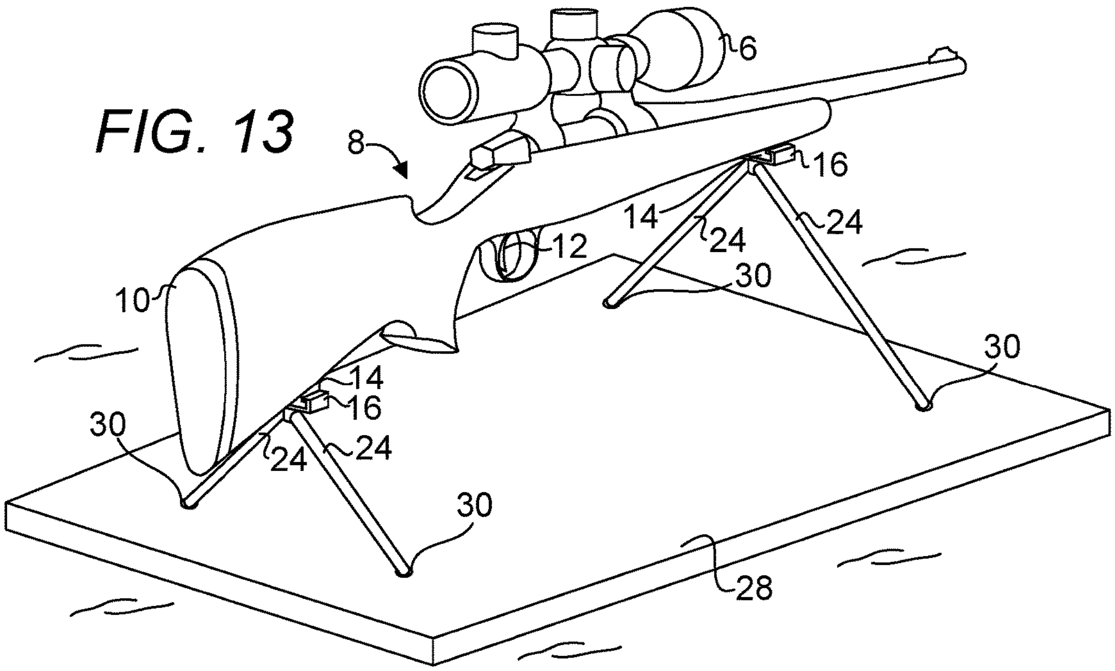

FIG. 13 depicts one embodiment of a shooting rest where the front and rear legs of the shooting rest are supported on and removably coupled to a base.

Figure 14:
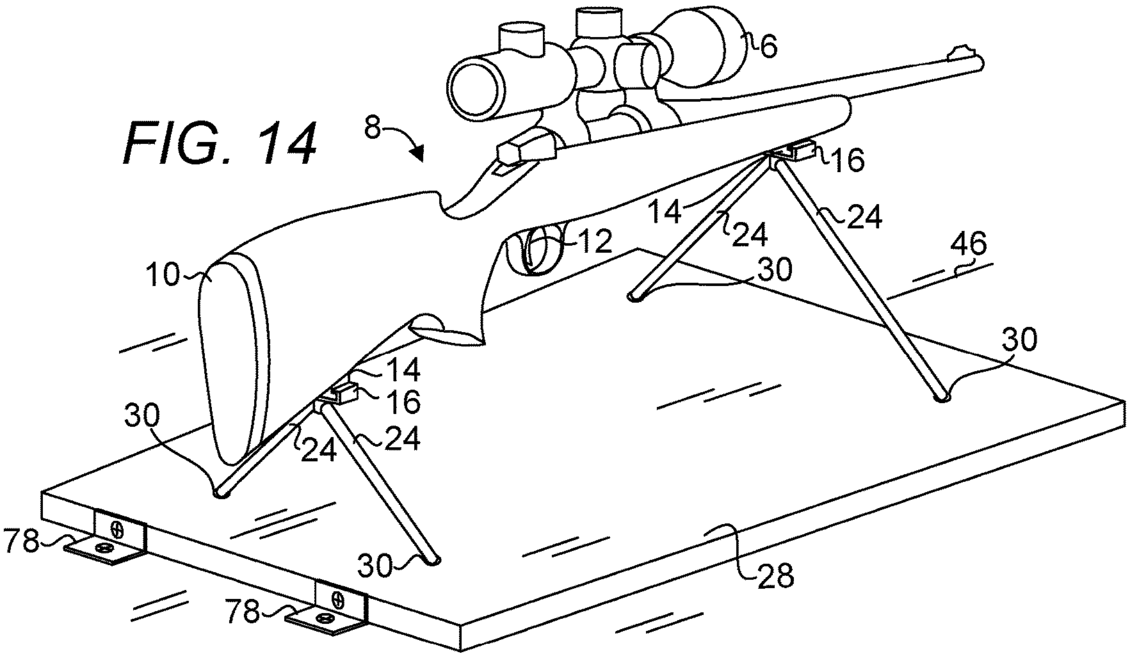

FIG. 14 depicts one embodiment of a shooting rest where the front and rear legs of the shooting rest are supported on and removably coupled to a base that is secured to a support surface.

Figure 15:
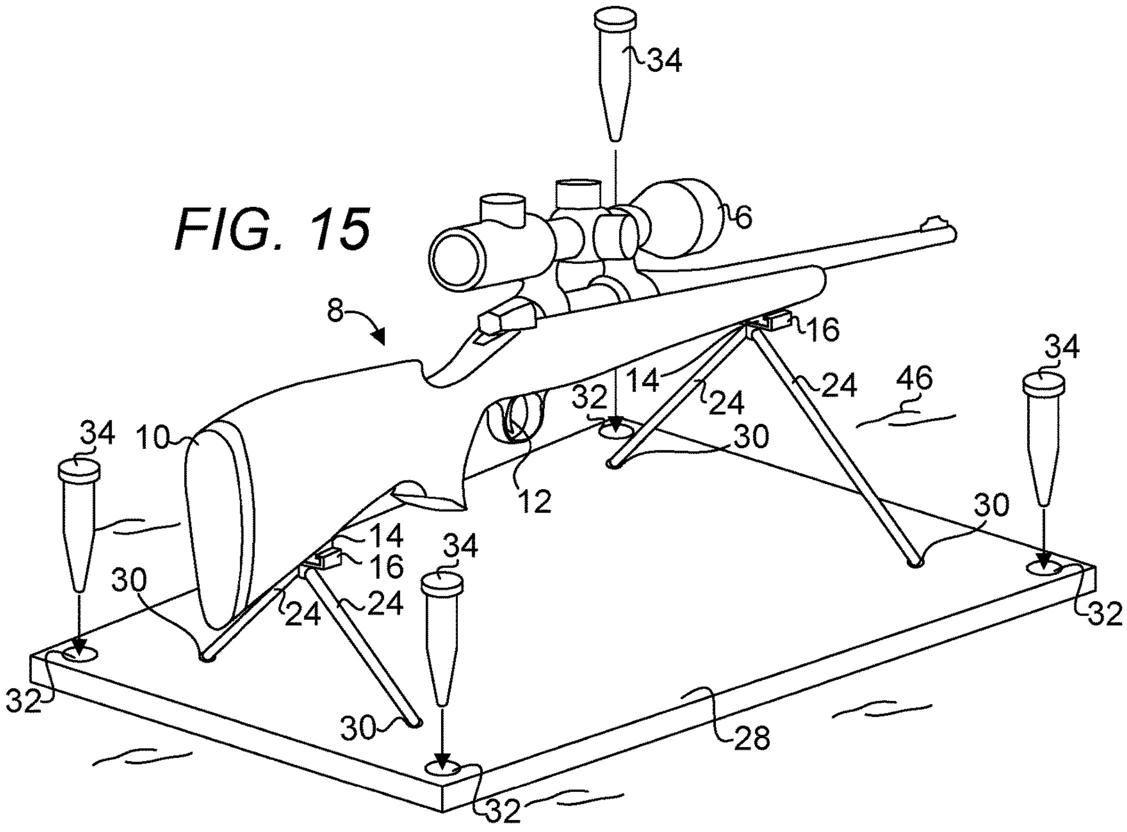

FIG. 15 depicts one embodiment of a shooting rest where the front and rear legs of the shooting rest are supported on and removably coupled to a base that is secured to an undulating support surface.

Figure 16:
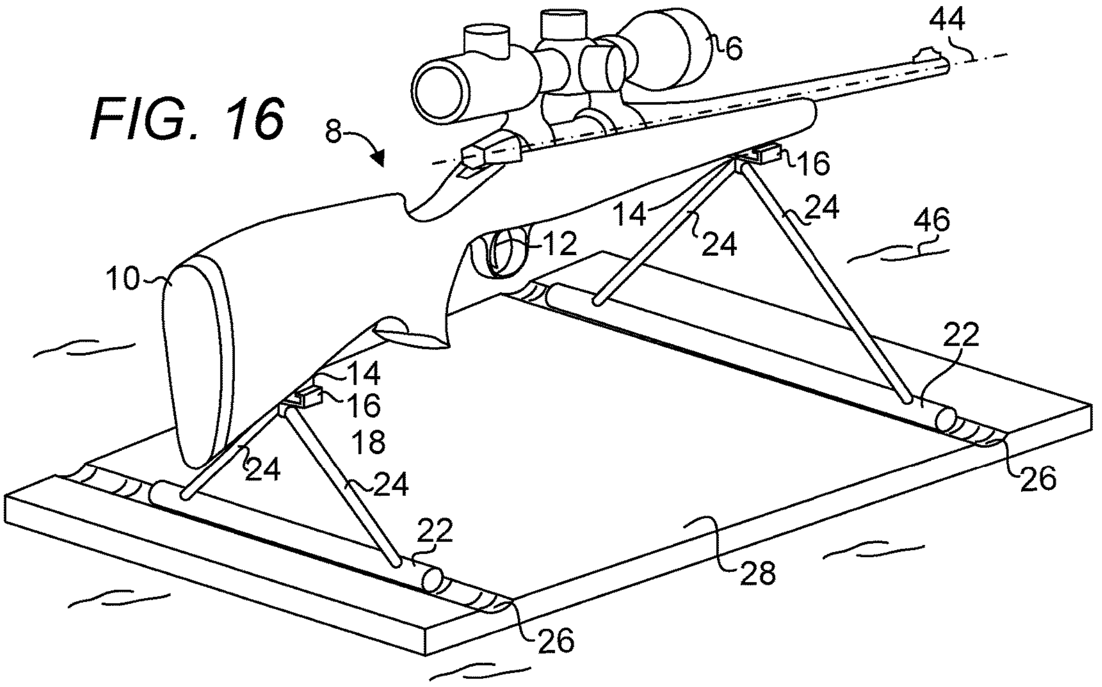

FIG. 16 depicts one embodiment of a shooting rest where the front and rear legs of the shooting rest are supported on and removably coupled to a base.

Figure 17:
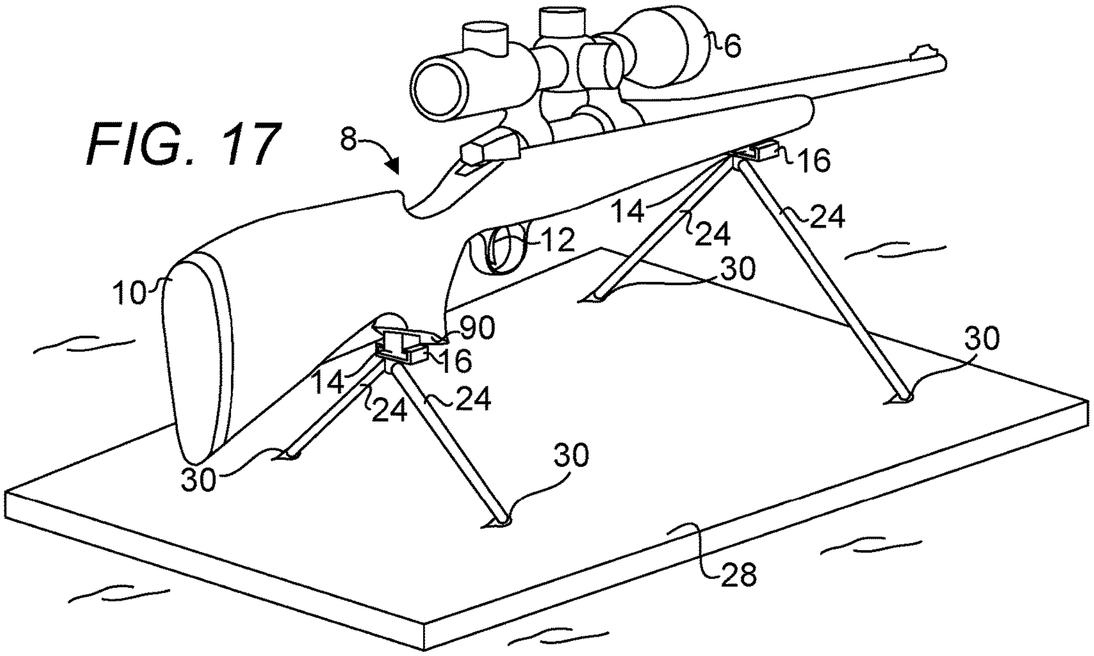

FIG. 17 depicts one embodiment of a shooting rest where each support receiver is configured in a tear drop shape.

Figure 18:
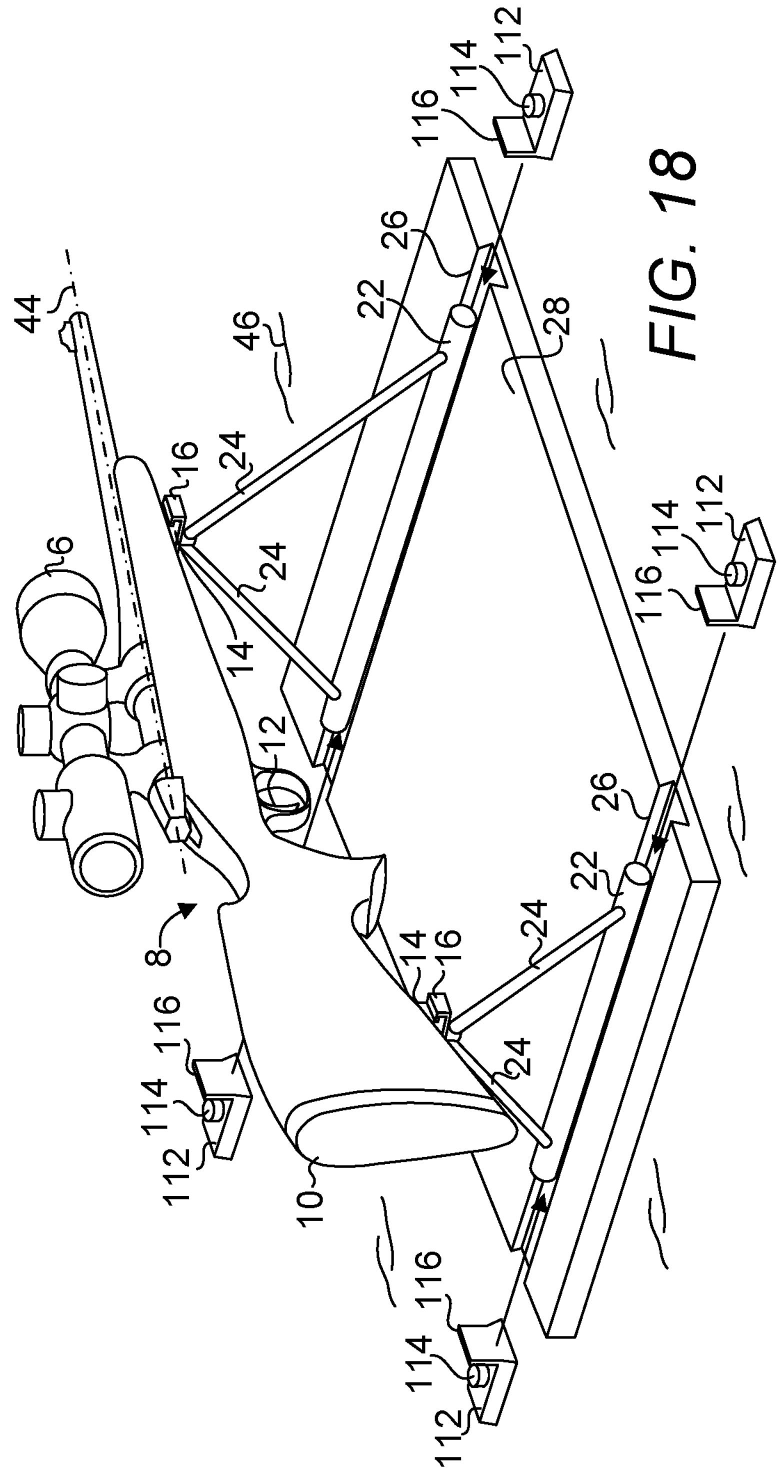

FIG. 18 depicts one embodiment of a plurality of lateral retainers where the lateral position of a projectile device coupled with a present shooting rest can be maintained.

Figure 19:
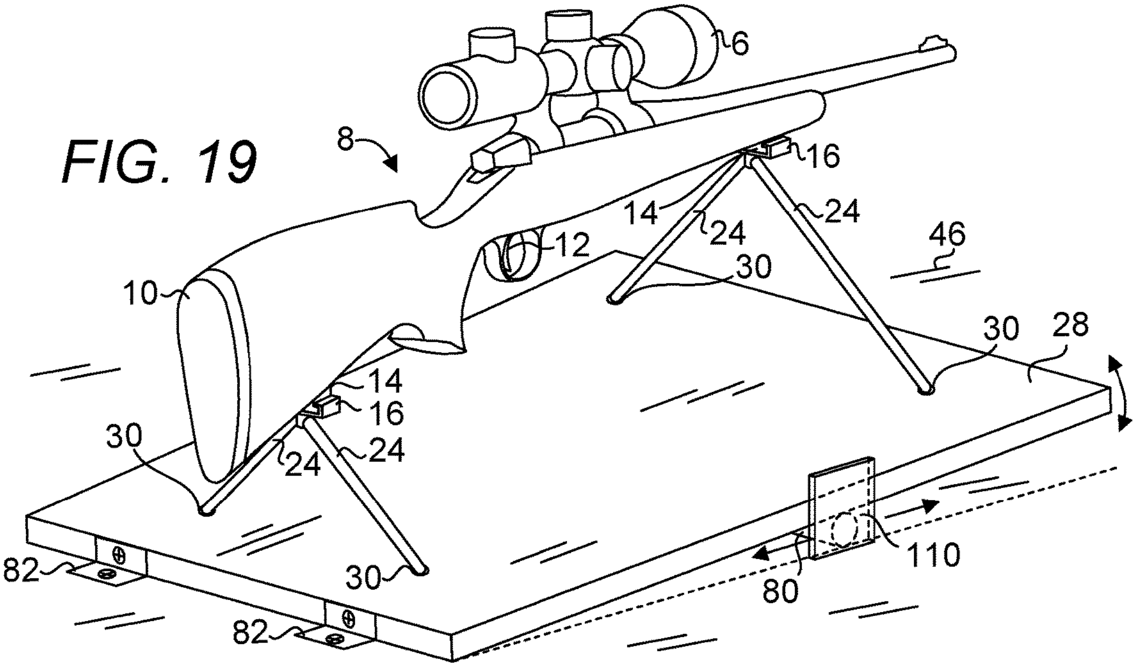

FIG. 19 depicts one embodiment of a shooting rest where the front and rear legs of the shooting rest are supported on and removably coupled to a base that is secured to a support surface and whose pitch is configured to be alterable.

Figure 20:
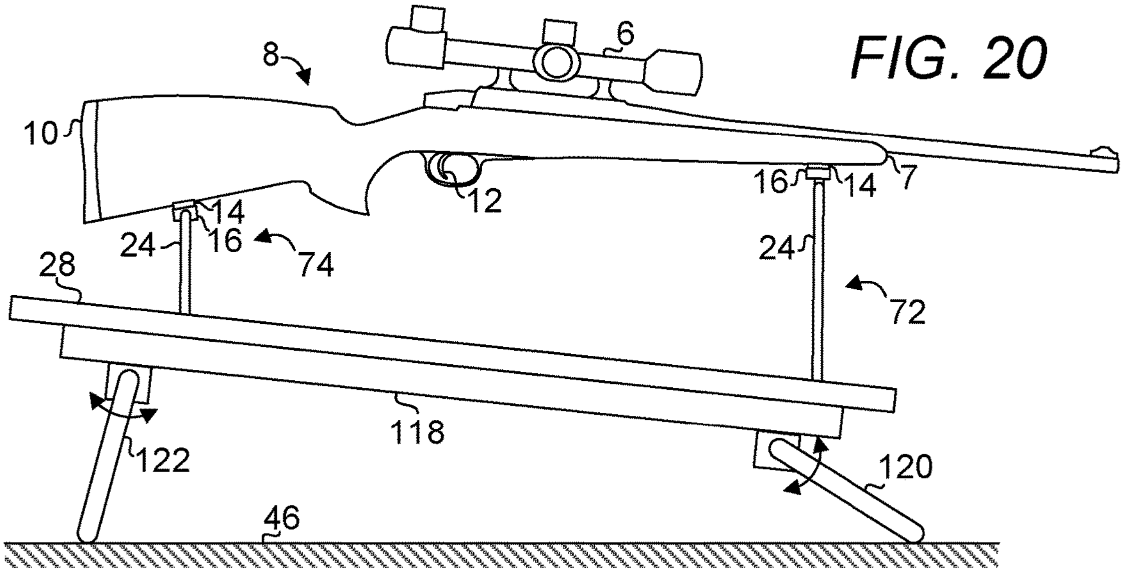

FIG. 20 depicts one embodiment of a shooting rest where the base of the shooting rest is removably coupled to a pitch and height-adjustable secondary base.

Figure 21:
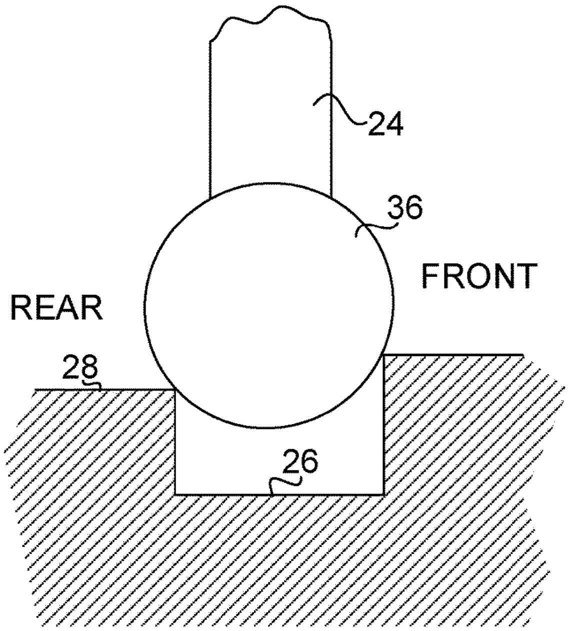

FIG. 21 depicts one embodiment of a channel configured for supporting a foot capped leg.

Figure 22:
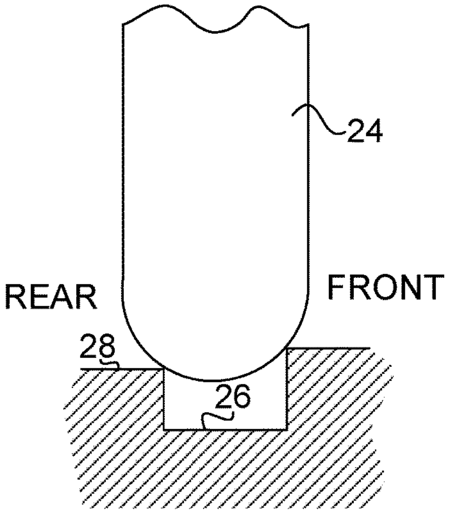

FIG. 22 depicts one embodiment of a channel configured for supporting a leg.

Figure 23:
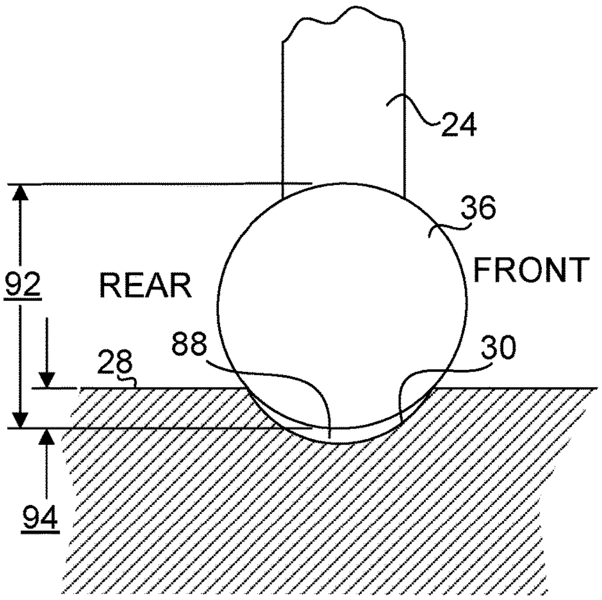

FIG. 23 depicts one embodiment of a support receiver configured for supporting a foot capped leg.

Figure 24:
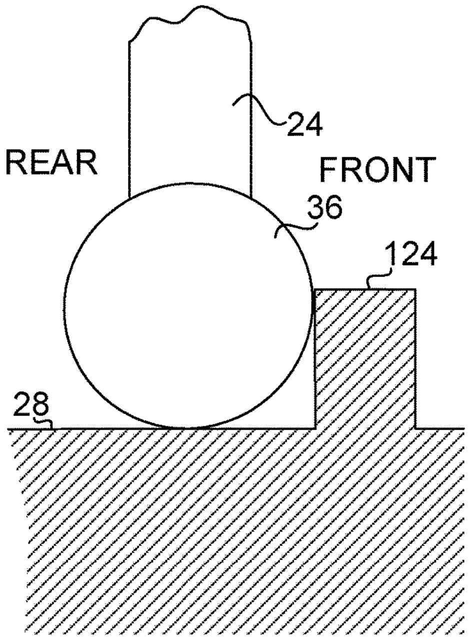

FIG. 24 depicts one embodiment of a base for supporting legs of a projectile device.

Figure 25:
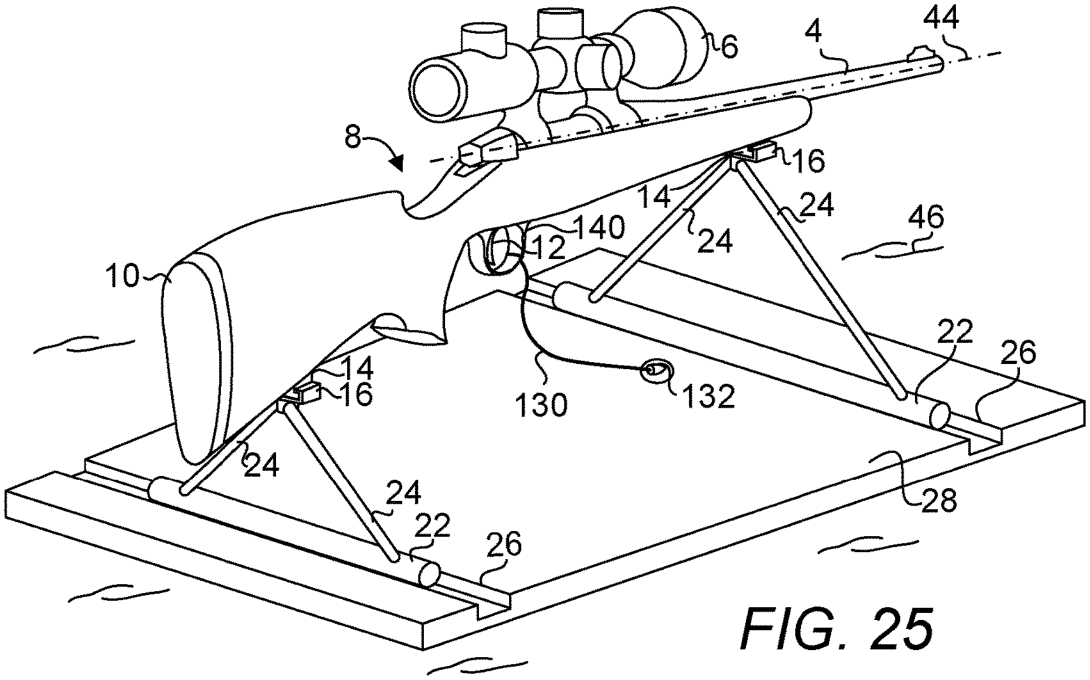

FIG. 25 depicts one embodiment of a shooting rest where the front and rear legs of the shooting rest are supported on and removably coupled to a base.

Figure 26:
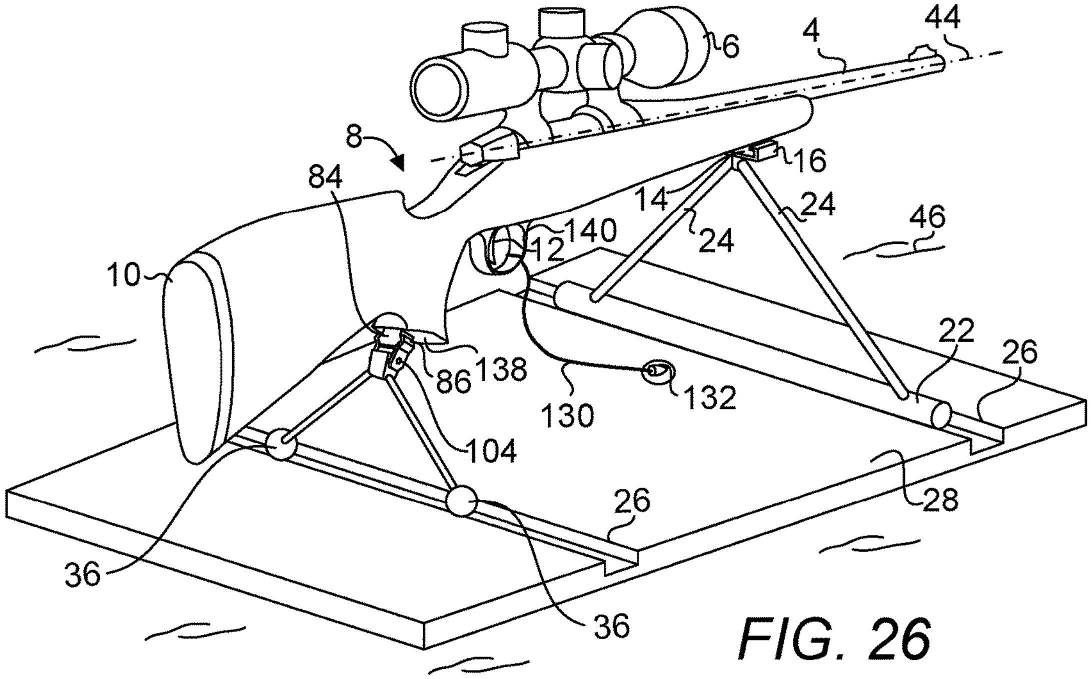

FIG. 26 depicts one embodiment of a shooting rest where the front and rear legs of the shooting rest are supported on and removably coupled to a base at their respective first ends and the rear legs are removably coupled to the heel plug of a projectile device at a second end.

Figure 27:
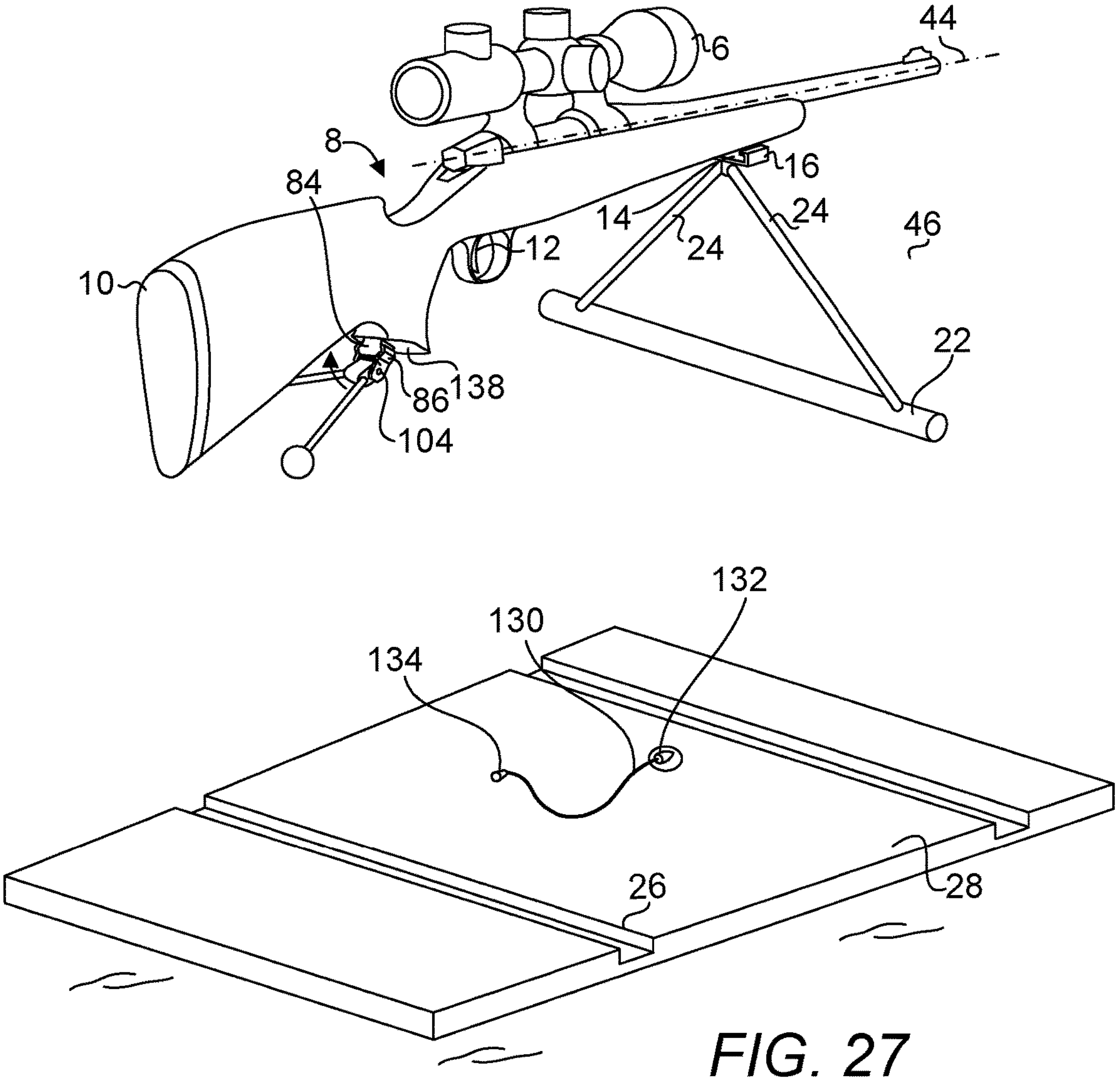

FIG. 27 depicts one embodiment of a shooting rest where the rear legs are removably coupled to the heel plug of a projectile device and the rear legs are configured to be stowable.

Figure 28:
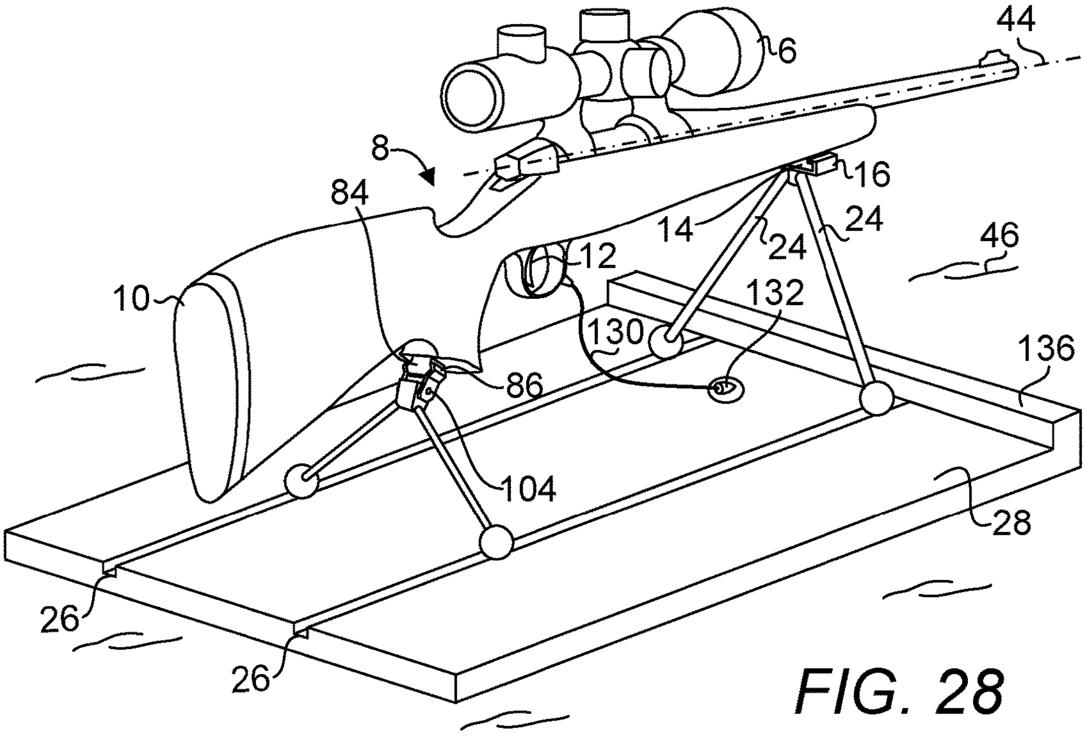

FIG. 28 depicts one embodiment of a shooting rest where the front and rear legs of a projectile device are removably coupled to grooves or channels aligned substantially parallel to the direction of recoil of the projectile device.

Figure 29:
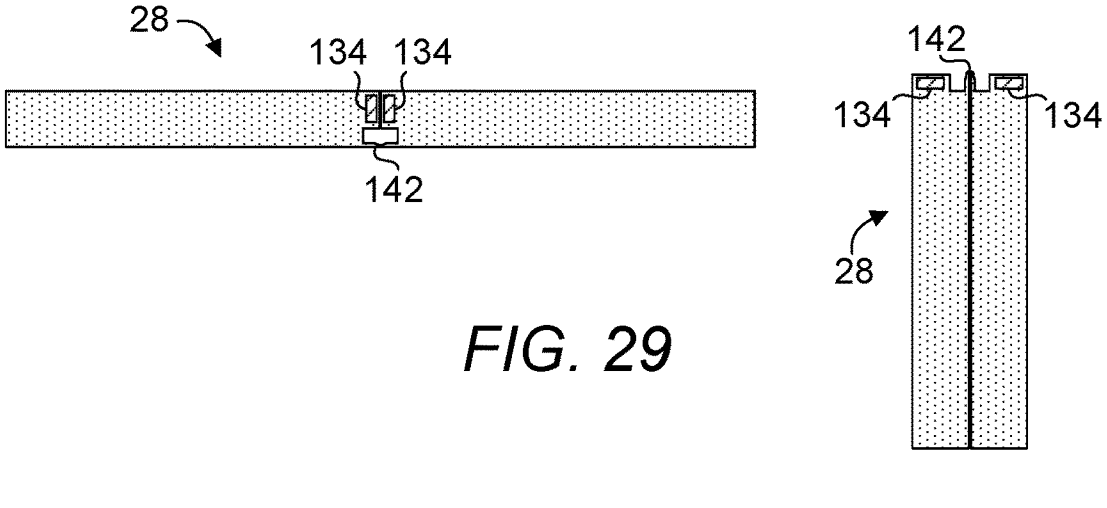

FIG. 29 depicts front views of one embodiment of a collapsible base in both its erected state and its collapsed state.

Figure 30:
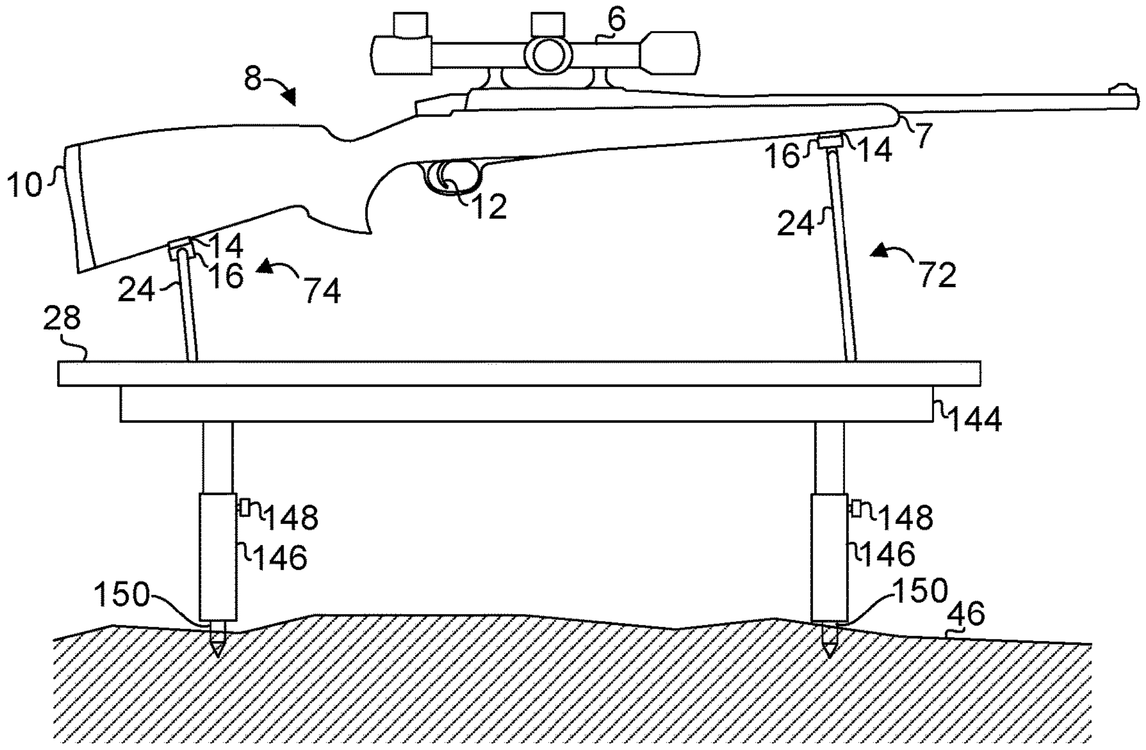

FIG. 30 depicts one embodiment of a shooting rest where the base of the shooting rest is removably coupled to a pitch and height-adjustable secondary support.

PARTS LIST

2—shooting rest
4—rifle
6—scope
7—forestock
8—stock
10—butt
12—trigger
14—adaptor
16—sleeve
18—upper end portion
20—lower end portion
22—cylindrical rod
24—leg
26—channel
28—base
30—support receiver
32—aperture
34—stake
36—foot
38—width of base
40—length of base
42—height of base
44—central axis of firearm
46—support surface or ground
48—plug
50—screw
52—hole
54—socket
56—hole
58—pin
60—frame
62—stand
64—rear end adjuster
66—front end adjuster
68—lock
70—post
72—front support
74—rear support
76—user
77—user's shoulder
78—bracket
79—user's hand
80—rod
82—hinge
84—Picatinny or Weaver rail
86—Picatinny or Weaver rail bracket
88—gap
90—grip of stock
92—diameter of foot
94—height of portion of foot within support receiver
96—telescopic leg
98—lock
100—knob
102—jack screw
104—pitch adjustment mechanism for a pair of legs
106—counteraction mechanism
108—handle
110—guide
112—block
114—screw
116—barrier
118—platform
120—front support
122—rear support
124—curb
126—roll axis of support
128—pitch axis of support
130—elastic member
132—fastener
134—magnetic material
136—raised bar
138—heel plug
140—trigger guard
142—hinge
144—secondary support

146—length-adjustable leg, e.g., telescopic leg
148—adjustment knob
150—spike

PARTICULAR ADVANTAGES OF THE INVENTION

In contrast to a shooting sled that is designed to stunt or arrest recoil of a projectile device upon firing at the stock of the projectile device, the present shooting rest allows recoil to occur naturally without inadvertently redirecting departing bullets or shots from the projectile device. The weight of the sled prevents the natural tendency of the weapon to retract violently at high speed to counteract the forces associated with a departing bullet or shot of the weapon, causing the barrel of the weapon to oscillate just enough to direct the bullet or shots in an unintended direction, causing inaccuracies.

An existing shooting sled is incapable of allowing a shooter to hold the projectile device which is supported on the shooting sled against his shoulder as in the case of shooter-held shooting. Many shooters prefer a realistic shooting posture as if a weapon is held in hands with the butt of the stock contacting the shooters shoulder. By having a shooter absorb recoils, the requirement for a rest that is heavy enough to withstand recoils is lessened. The present shooting rest allows its user to use a normal shooting posture when using it.

The present shooting rest allows a projectile device used thereupon to be returned to a position identical to the position prior to a shot being taken. In contrast, with an existing sled, the shooting position is repeatable, making it impossible for the shooter to create rapid successions of shots with satisfactory accuracy. With an existing sled, the projectile device may only be returned to a general position and orientation. As an experience shooter can readily appreciate, a minute difference in orientation and position can have significant ramifications in shooting over great distances.

DETAILED DESCRIPTION OF A PREFERRED EMBODIMENT

The term “about” is used herein to mean approximately, roughly, around, or in the region of. When the term “about” is used in conjunction with a numerical range, it modifies that range by extending the boundaries above and below the numerical values set forth. In general, the term “about” is used herein to modify a numerical value above and below the stated value by a variance of 20 percent up or down (higher or lower).

Figure 1:
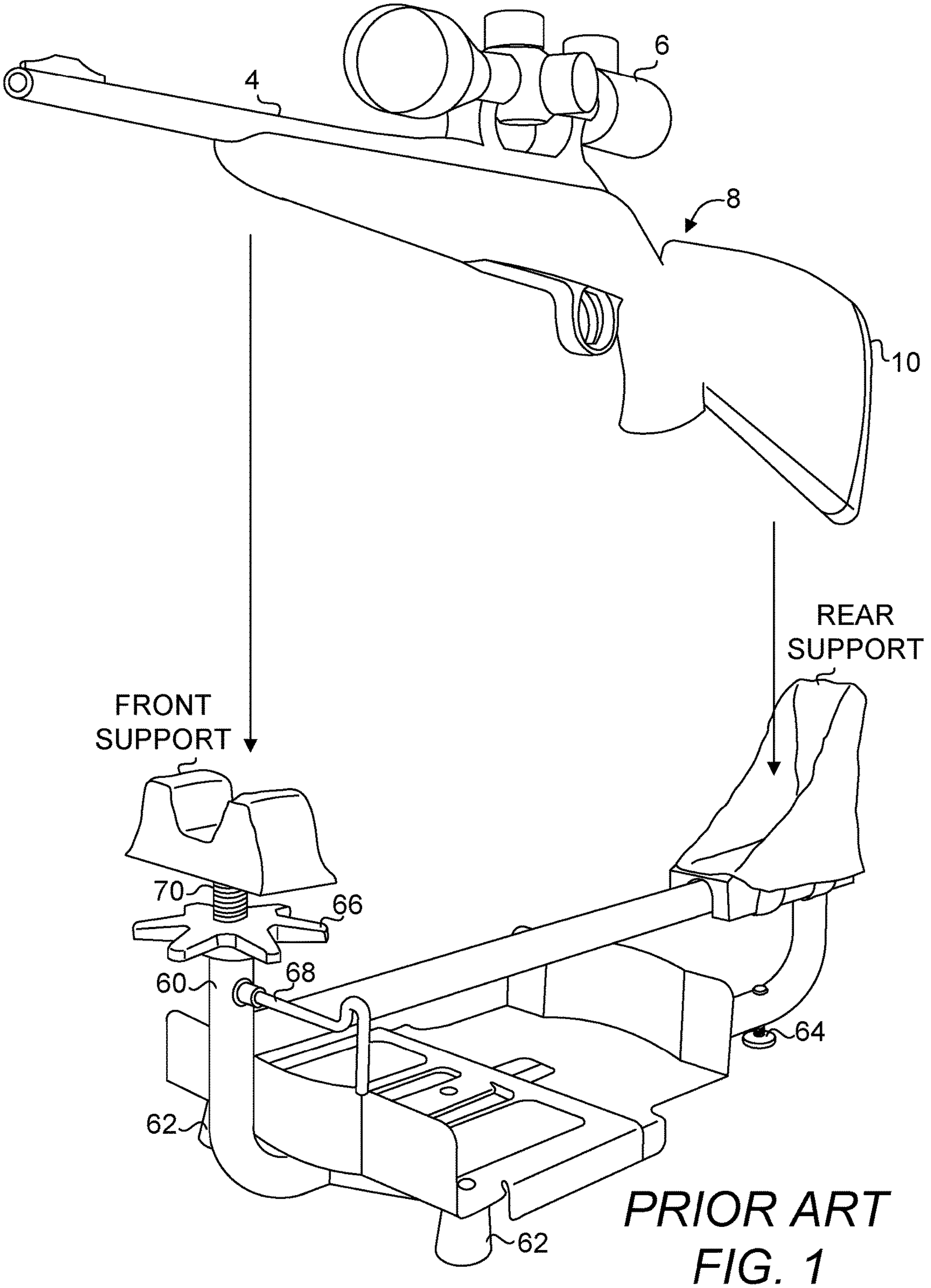
FIG. 1 is a top front perspective view of a prior art shooting sled used with a projectile device.

FIG. 1 is a top front perspective view of a prior art shooting sled used with a projectile device. The prior art shooting sled is essentially a frame 60 supported on stands 62 and rear end height adjuster 64 where the frame includes a front support supported on a post 70 that is height adjustable via the front end adjuster 66 and lockable via lock 68 and a rear support. A projectile device 4 is supported at its forestock on the front support and its stock, on the rear support. The front and rear supports are essentially support frames enveloped in soft cushion materials configured for receiving projectile devices of various makes and sizes. An iron sight, scope 6, e.g., telescope or another sight aid may be attached atop the forestock of the projectile device 4 for aiding the user in sighting in the projectile device or aiming the projectile device at a target. A projectile device is not precisely but rather loosely supported on the shooting sled.

Therefore upon removal of a projectile device from the shooting sled, it is highly unlikely that the projectile will be placed in a position and orientation that are identical to those prior to its removal. Therefore, the projectile device cannot be repeatably supported identically with the prior art shooting sled. Further, upon firing of a projectile device supported on the shooting sled, recoil of the projectile device causes the projectile device 4 to push against the rear support at the butt 10 of its stock 8. The weight of the shooting sled in turn prevents the shooting sled to be moved in response to the recoil but instead the recoil is arrested, causing the projectile device to oscillate and orientation of the projectile device to change just as the bullet departs from the projectile device but the bullet may still be disposed within the barrel of the projectile device. As a result, the intended path of the bullet may be inadvertently altered causing the bullet to deviate from an intended target.

Figure 2:
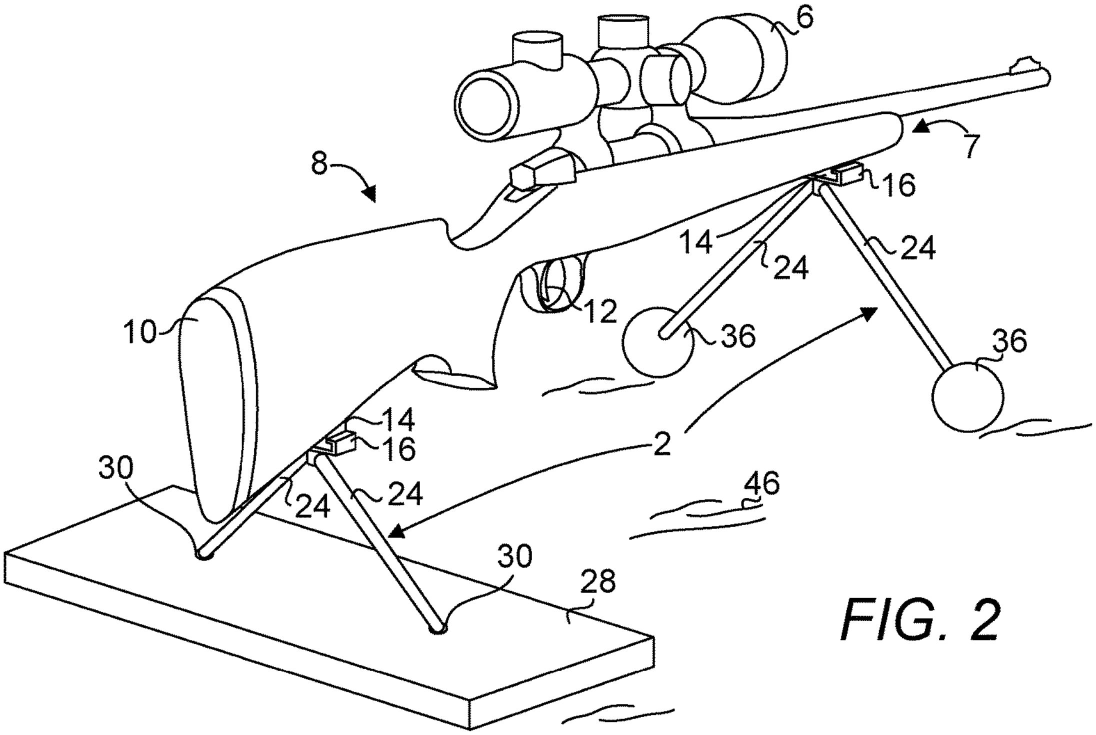
FIG. 2 is a rear top perspective view of one embodiment of a present shooting rest adapted for use with a projectile device.
Figure 3:
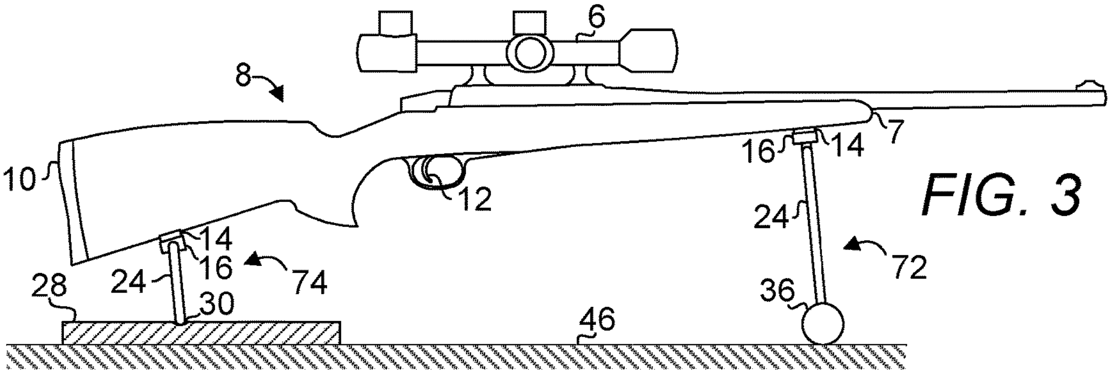
FIG. 3 is a side view of one embodiment of a present shooting rest adapted for use with a projectile device, depicting a cross-sectional profile of a base upon which a leg of the shooting rest is supported.
Figure 4:
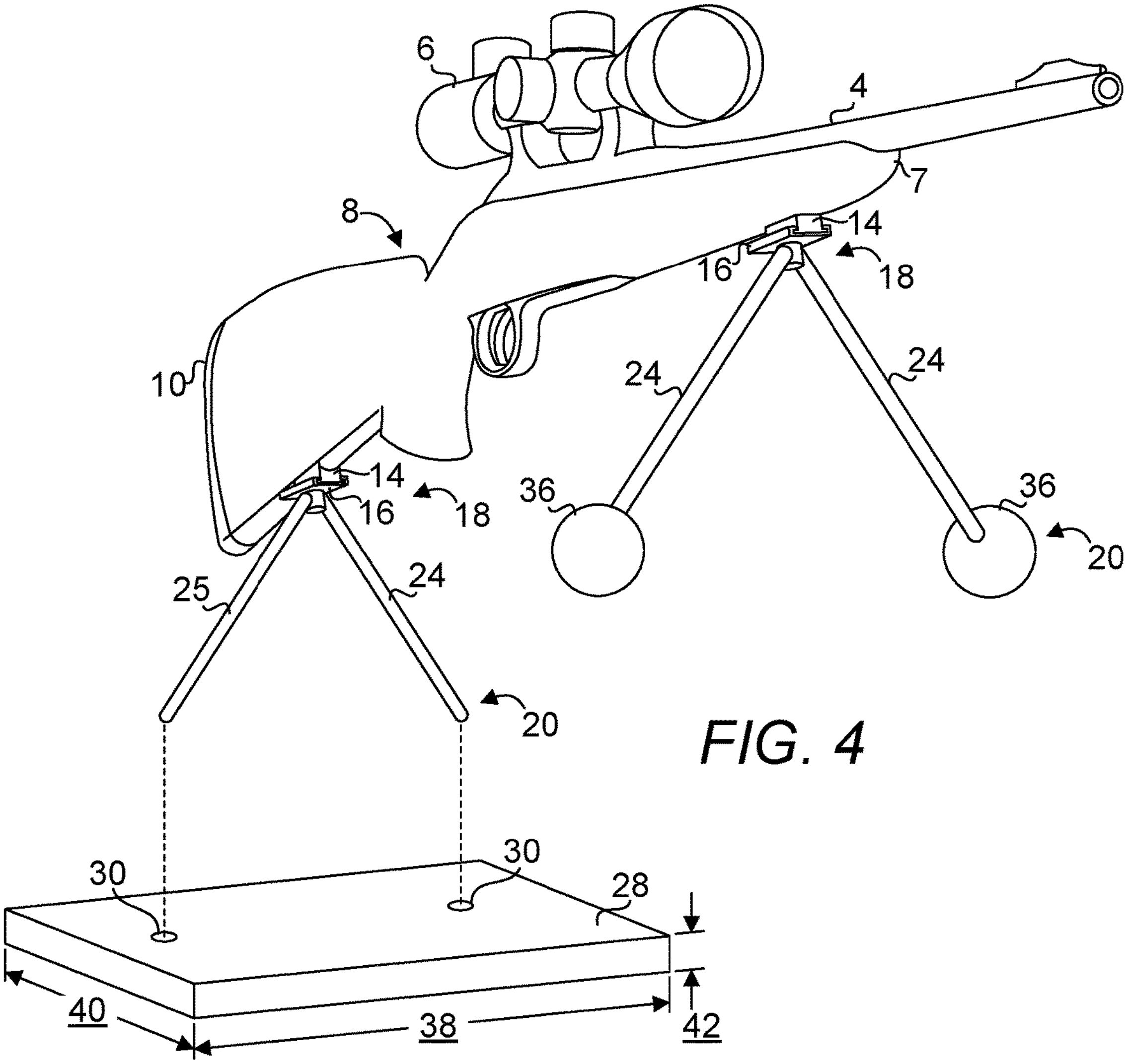
FIG. 4 is a front perspective view of one embodiment of a present shooting rest adapted for use with a projectile device.
Figure 5:
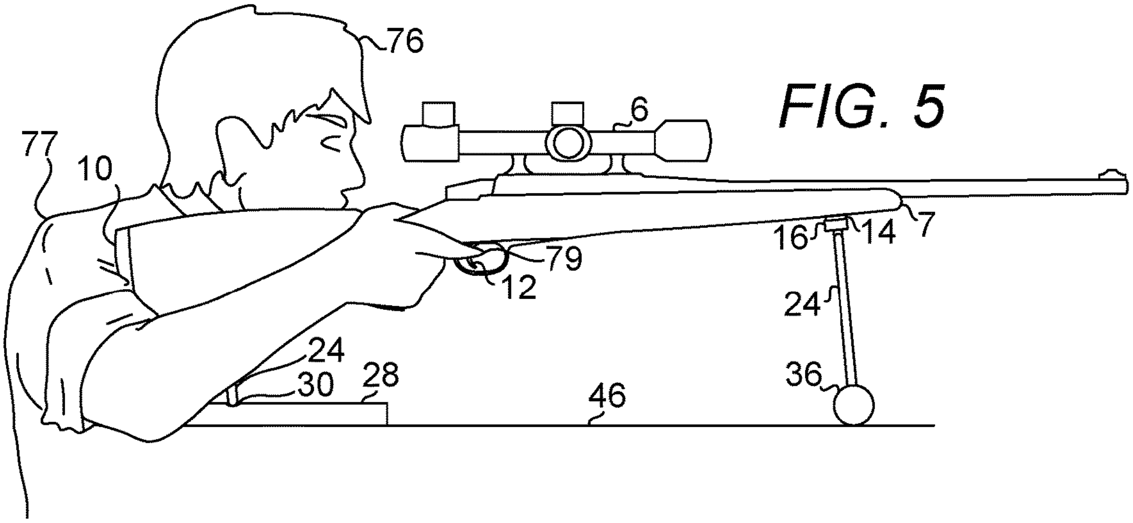
FIG. 5 is a side view of one embodiment of a present shooting rest adapted for use with a projectile device, depicting an allowable posture of a user while using this shooting rest.

FIGS. 2-24 disclose various embodiment of the present shooting rest suitable for overcoming the shortcomings of existing shooting sleds disclosed elsewhere herein. FIG. 2 is a rear top perspective view of one embodiment of a present shooting rest 2 adapted for use with a projectile device 4, e.g., long gun, rifle, shotgun, handgun, etc. FIG. 3 is a side view of one embodiment of a present shooting rest 2 adapted for use with a projectile device 4, depicting a cross-sectional profile of a base 28 upon which a leg 24 of the shooting rest 2 is supported. A leg 24 may be constructed from a fiberglass rod, memory-flex materials capable of holding its shape, etc. In one embodiment, a leg 24 measures about ⅜ inch in diameter. If constructed from memory-flex materials, each leg is capable of in-situ adjustments to suit the locations of their support receivers. The base 28 is preferably made of materials of suitable weight such that it is sufficiently stable to resist movement during recoil of the projectile device. In one embodiment, the length 40, width 38 and height 42 of the base 28 measures about 18 inches by about 14 inches by about 1 inch, respectively. In another embodiment, a base 28 configured for accommodating both a front and a rear support preferably measures about 36 inches in length, about 14 inches in width and 1 inch in height. FIG. 4 is a front perspective view of one embodiment of a present shooting rest 2 adapted for use with a projectile device 4. Disclosed herein is a shooting rest or an apparatus for supporting a projectile device, firearm or weapon having a forestock 7 and a stock 8 while allowing a recoil of the firearm 4 to not be restricted and the firearm 4 to be repeatably returned to the position the firearm 4 was supported prior to the recoil. The recoil motion of a projectile device is said to be “restricted” when the projectile device is used on a shooting sled where its recoil is arrested at the butt of its stock. The apparatus 2 includes at least two supports, each having an upper end portion 18 and a lower end portion 20 that is opposingly disposed from the upper end portion 18. A first one 72 of the supports is configured to be removably attached at its upper end portion 18 to the forestock 7 of the firearm 4 and a second one 74 of the supports is configured to be removably attached at its upper end portion 18 to the stock 8, or more specifically in one embodiment, at a grip of stock 90 as shown in FIG. 17, of a firearm. In one embodiment, an adaptor 14 is removably or fixedly attached to a bottom surface of the forestock 7 and a bottom surface of the stock 8 and a sleeve 16 is adapted to each of the upper end portion 18 of the first support 72 and the second support 74. In one embodiment, an adaptor 14 is an inverted T-shaped structure. A sleeve 16 configured to be coupled to the adaptor 14 is then a structure having a shape complementary to the adaptor 14. In order to couple a support 72, 74 to the projectile device 4, a sleeve 16 is slid over the inverted T-shaped adaptor 14. The sleeve 16 can be either be retained with the adaptor 14 by friction or it can be alternatively or additionally be retained with a fastener, e.g., screw, or a snap fit lock. It shall be apparent then that each support 72, 74 can be removed from projectile device 4 when supports are not required, i.e., when traditional hand-held shooting is desired. However, if hand-held shooting is still desired while the projectile device 4 is supported on the present supports, a user can still do so as the present shooting rest 2 allows a user to contact the stock's butt 10 with his shoulder as practiced in traditional shooting practices as shown in FIG. 5 to assist in handling recoil and to allow the user to view through the scope 6 in a natural posture. FIG. 5 is a side view of one embodiment of a present shooting rest 2 adapted for use with a projectile device 4, depicting an allowable posture of a user 76 while using this shooting rest. It shall be noted that, in contrast to the shooting sled shown in FIG. 1, the present shooting rest allows a user to assume a posture that is consistent with the normal hand-held shooting posture with the butt 10 of the stock 8 held against the user's shoulder 77 and the user's hand 79 placed at trigger 12.

Referring back to FIGS. 2-5, in one embodiment, the apparatus further includes a base 28 having a top surface, the base 28 including at least one support receiver configured for removably engaging a support of the two supports at its lower end portion 20. As shown, the support receiver includes a pair of substantially semi-spherical depressions 30 that are disposed on the top surface of the base 28. The lower end portion 20 of each of the two supports is preferably substantially cylindrical and rounded at its tip. For the support not coupled to a base, i.e., the front support, the lower end portion of each leg 24 may be terminated with a foot 36 to reduce the risk for the front support to hit a snag on the surface upon which the support is disposed. In one embodiment, the front support may alternatively be configured to be coupled with a support receiver disposed on a base. Each of FIGS. 6-8 is a side view of a leg 24 of a support relative to a base 30 upon which the leg 24 of the support is supported, depicting a position of the leg 24 prior to the firing of a projectile device 4 coupled with shooting rest and a position of the leg as a result of the firing of the projectile device 4. In one embodiment, the lower end portion of each support is preferably terminated with a rounded (semi-spherical) structure configured to allow unobstructed sliding of the support with a surface upon which the support is supported. In the embodiment shown in FIGS. 6, 7 and 8, the present shooting rest further includes a profile adapted to a support receiver. FIG. 7 depicts a profile that slopes downwardly from the support receiver. In this embodiment, a recoil causes a leg 24 to follow a profile that is closer to a profile that is naturally obtained if the projectile device 4 had been hand-held during firing. FIG. 8 depicts a profile that slopes upwardly from the support receiver but at a more gradual pace than the embodiment shown in FIG. 6. Referring back to FIG. 5, during recoil, the legs 24 must rise slightly in order for them to be dislodged from their corresponding depressions 30 and slide along the top surface of the base 28 in the direction opposite to the departing bullet. The depth of the depressions 30 and/or the surface quality of the depressions and profile may also be adjusted to alter the rate at which recoil can occur. In contrast to a shooting sled, upon firing the firearm, recoil occurs without restriction with the present shooting rest as there lacks a support as in the case of the rear support 74 of the shooting sled of FIG. 1 that restrains the recoil.

FIG. 9 depicts one embodiment of an adaptor suitable for securing one embodiment of the present shooting rest to a projectile device. The upper end portion of a support is adapted for attachment to a forestock or stock of a firearm via a quick-release mechanism. In this embodiment, a plug 48 is configured to be attached to the firearm 4 at a bottom surface of either the forestock 7 or the stock 8 of the firearm 4. The plug 48 includes a hole 52 configured for receiving a pin on one end and a screw 50 to be fastened in an aperture made available on the forestock 7 or the stock 8. An existing forestock or stock of a projectile device may be modified to accommodate a plug. New projectile devices may be fabricated with provisions built into the devices during manufacturing. A support is essentially a pair of legs 24 terminating at a socket 54. The socket 54 includes a hole 56, also configured for receiving a pin. When used together, the plug 48 essentially acts as a male portion configured to be inserted in the socket 54. With the holes 52, 54 aligned, the socket 54 may be locked onto the plug 48 with a pin 58, securing the support to the projectile device.

FIG. 10 depicts one embodiment of an adaptor suitable for securing one embodiment of the present shooting rest to a projectile device. The upper end portion of a support is adapted for attachment to a forestock or stock of a firearm via a rail-bracket mechanism. In this embodiment, a Picatinny or Weaver rail 84 is configured to be attached to the firearm 4 at a bottom surface of either the forestock 7 or the stock 8 of the firearm 4. A Picatinny rail is also known as a MIL-STD-1913 rail, Standardization Agreement 2324 rail, or tactical rail and is a rail disposed on some firearms that provides a standard mounting platform consisting of rails with multiple transverse slots. Some existing projectile devices may already include such rails on a bottom surface of a forestock 7 rendering the mounting of such a rail at a bottom surface of the unnecessary. The rail 84 includes one or more holes 52 configured for receiving one or more fasteners to be fastened in an aperture made available on the forestock 7 or the stock 8. Again, an existing forestock or stock of a projectile device may be modified to accommodate a rail. New projectile devices may be fabricated with provisions built into the devices during manufacturing. A support is essentially a pair of legs 24 terminating at a bracket 86. When used together, the rail 84 essentially includes a portion sized and shaped substantially the same as the bracket 86 that is slid into an opening of the bracket 86 and secured via a lock or by friction therein.

FIG. 11 depicts one embodiment of a support suitable for supporting a projectile device. In this embodiment, three adjustment mechanisms are shown. A first adjustment mechanism allows the length of each leg to be altered. This is useful when a user desires to dispose a support-equipped projectile device at a specific height. In the embodiment shown, each leg is a telescopic leg 96 where an outer sleeve is configured to slide over an inner leg and the outer sleeve is configured to be lockable onto the inner leg via a lock 98, e.g., a screw. Other adjustable-length legs are possible. A second adjustment mechanism allows the spread a pair of legs 24 to be adjusted while maintaining the contribution of each leg to the spread thereby allowing the roll angle of each support about roll axis 126 to be maintained as the legs spread or approach one another symmetrically about the roll axis 126. The spread adjustment of the legs may be used to adjust the stance and height of the support. In the embodiment shown, the spread of the legs is controlled via the use of a jack screw 102 coupled to a respective nut disposed within a leg 24. A user may either rotate a knob 100 in one direction to bring the legs 24 closer together or in the opposite direction to spread the legs 24 farther apart. A rotation of the jackscrew causes each of the legs 24 to spread at a rate that is the same to its counterpart. Therefore, the roll angle of each support can be maintained. Other spread-adjustable legs are possible provided that the spread can be adjusted without affecting the roll angle of the support and that such adjustment can be made expediently. A third adjustment mechanism allows each support to rotate with respect to the projectile device to which the support is mounted, thereby enabling a pitch adjustment to the projectile device. In the embodiment shown, this mechanism 104 is a pivot. The pivot is disposed coaxially with a pitch axis that is substantially at right angle to the central axis (44 of FIG. 16) of a projectile device to which the support is mounted. Additionally, a lock may be used to ensure a pitch is retained once a desired pitch of the projectile device has been located.

FIG. 12 depicts one embodiment of a support suitable for allowing adjustment of the spread of legs 24 of the support. No adaptor to a rail of a projectile device or another attaching means is shown. Disclosed is a counteraction mechanism 106 having essentially two counteracting parts, facilitated, e.g., via counteracting gears. A leg 24 is disposed on one of the two counteracting parts. A handle 108 is provided to facilitate adjustment of the spread of the legs 24. When the handle 108 is rotated in one direction, the legs 24 are spread apart and when the handle 108 is rotated in the opposite direction, the legs 24 are brought closer together. The rate at which one leg rotates matches the rate at which the other leg rotates. Therefore, when used in supporting a projectile device, such a support will maintain the roll angle of the projectile device even when the spread between the legs 24 have been adjusted.

FIG. 13 depicts one embodiment of a shooting rest where the front and rear legs of the shooting rest are supported on and removably coupled to a base. FIG. 14 depicts one embodiment of a shooting rest where the front and rear legs of the shooting rest are supported on and removably coupled to a base that is secured to a support surface. In this embodiment, the front and rear supports are both configured to be coupled with support receivers 30 disposed on a common base 28. Increased precision in shooting is expected as two removably coupled supports improves the yaw stabilization of the projectile device upon firing. However, the increased size of the base may not be preferred and it is also more difficult to ensure that two supports are properly engaged with support receivers compared to only one support. The two support receivers 30 may alternatively be disposed on two bases 28 such that one large continuous base is not required. Referring to FIG. 14, the base 28 may be secured to a support surface 46 using one or more bracket 78 to reduce the weight requirement of the base 28 at the front edge and the rear edge of the base. In another embodiment, the base 28 is configured to be clamped onto a support surface 46 using a clamp, e.g., C-clamp, etc.

FIG. 15 depicts one embodiment of a shooting rest where the front and rear legs of the shooting rest are supported on and removably coupled to a base that is secured to an undulating support surface 46, e.g., ground. In this embodiment, the base 28 further includes two apertures connecting a top surface and a bottom surface. Upon selecting a location at which a base 28 is to be disposed, a ground auger or stake 34 can be driven through each aperture 32 into the support surface 46 to secure the base 28.

FIG. 16 depicts one embodiment of a shooting rest where the front and rear legs of the shooting rest are supported on and removably coupled to a base 28. In this embodiment, a support receiver includes a channel 26 having a curvature radius. Each channel 26 is disposed on the top surface of the base 28 and substantially at right angle to the central axis 44 of the firearm. In one embodiment, the lower end portion of each support includes a cylindrical rod 22 having a radius that is smaller than the curvature radius of the channel 26 such that its corresponding support is configured to be removably cradled within the channel 26.

It shall be noted that, upon firing of the firearm, recoil occurs without restriction in a present shooting rest as each support (cylindrical rod) disengages from a corresponding support receiver (depression or channel) and the firearm is returnable to the position prior to the firing of the firearm by re-engaging the support with the corresponding support receiver. As such, a favorable position and orientation can be resumed for the next round of firing if desired. However, this is not possible with the shooting sled shown in FIG. 1.

FIG. 17 depicts one embodiment of a shooting rest 2 where each support receiver is configured in a tear drop shape. Upon firing, a recoil of the firearm causes each leg 24 to move rearwardly towards the narrow portion its support receiver 30 which guides it toward and elevates it slightly to reach the top surface of the base 28. As a result, the projectile device responds to the recoil in a more predictable manner while allowing it to cushion the recoil without arresting the motion.

FIG. 18 depicts one embodiment of a plurality of lateral retainers where the lateral position of a projectile device coupled with a present shooting rest can be maintained. In this embodiment, channels 26, each having an inverted trapezoidal profile is used. Disclosed herein are four blocks 112 although two blocks may suffice. A block 112 is essentially configured in a profile complimentary to the profile of a channel 26. Upon achieving a suitable lateral alignment, at least two blocks 112 on one side of the base 28 are removably installed within their respective channels 26. Each block 112 is slid through a channel 26 until its barrier 116 come in contact with a base-engaging portion of a leg 24. Upon achieving a suitable position of a block 112, the block may be locked down using a screw 114 that is configured to push against a bottom portion of a channel 26, causing the block to push against the upper protruding portions of the channel 26 and locking the block 112 by friction to the channel 26. With two blocks 112 installed on one side, a lateral limit of the projectile device is established on the base 28. Therefore, the projectile device can be repeatably returned to the suitable position upon recoil by abutting one side of the base-engaging portions of the supports against the blocks 112 at their barriers 116. Two other blocks 112 may be used on the other side to define a second lateral limit of the projectile device such that a recoil causes the projectile device to be channeled rearwardly without any opportunities to deviate laterally without having cleared the barriers 116 of the blocks 112.

FIG. 19 depicts one embodiment of a shooting rest where the front and rear legs of the shooting rest are supported on and removably coupled to a base 28 that is secured to a support surface and whose pitch is configured to be alterable. As shown herein, a base is configured for pitch adjustment of the projectile device in the upward direction. The base 28 is pivotably secured at its rear end or edge via hinges 82 to a support surface 46. The relative position of the rear end and a front end, together define the pitch of the base. A rod 80 disposed underneath the base 28 is positioned along the shooting direction of the projectile device to create a desired pitch of the base 28 and hence the projectile device. Similarly, if a pitch adjustment of the projectile device in the downward direction is desired, the front end or edge of the base 28 is pivotably hinged via hinges 82 to the support surface 46. A rod 80 disposed underneath the base 28 is again positioned along the shooting direction of the projectile device to create a desired pitch of the base 28. Also disclosed is a mechanism for ensuring that the longitudinal axis of the rod 80 is disposed at an angle that is perpendicular to the direction in which the rod 80 is moved. Two guides 110, each disposed on one longitudinal end of the rod 80 and slidingly contacts a widthwise edge or side of the base 28, aids in ensuring that the rod can only move in the longitudinal direction of the base 28.

FIG. 20 depicts one embodiment of a shooting rest where the base of the shooting rest is removably coupled to a pitch and height-adjustable secondary base. In this embodiment, a base 28 is configured to be mounted on a platform 118 having a front pitch adjustable support 120 and a rear pitch adjustable support 122. As such, a base 28 may be elevated and its pitch may be adjusted even when the supports 72, 74 are not pitch adjustable.

FIG. 21 depicts one embodiment of a channel configured for supporting a foot 36 capped leg. The front edge of the channel 26 is configured to be higher than the rear edge of the channel 26. The opening of the channel is sized such that the foot 36 is sufficiently large to prevent the leg 24 from getting trapped within the channel 26 but sufficiently small that a sufficiently large portion of the foot 36 can be lodged in the opening of the channel 26. FIG. 22 depicts one embodiment of a channel 26 configured for supporting a leg 24. The raised front edge facilitates re-positioning of the legs 24 or feet 36 against the channel 26. The user of a present shooting rest can be certain when the projectile device has been returned to its position prior to firing as a properly positioned leg or foot will create a "click" sound as it is seated within the opening of a channel as there can only be a single position in the shooting direction where the leg or foot can be lodged in the channel. When disposed in this position, the projectile device is said to be disposed in the detent position with respect to the shooting rest.

FIG. 23 depicts one embodiment of a support receiver 30 configured for supporting a foot capped leg. Again, the foot 36 is configured sufficiently large to prevent the foot 36 from getting cradled in its entirety within the support receiver 30 but sufficiently small that a sufficiently large portion of the foot 36 can be lodged in the opening of the support receiver 30. It shall be noted that the radius of the support receiver 30 is configured to be smaller than the radius of the foot 36 such that when re-positioned in the support receiver 30, the foot 36 leaves a gap 88 within the opening of the support receiver 30. Again, there can only be a single position in the shooting direction where a leg or foot can be lodged in the support receiver 30. In one embodiment, the foot is configured such that the ratio of the height of the portion of foot within support receiver 94 to the foot diameter 92 is about ⅓. Applicant discovered that by disposing the feet 36 of supports in this configuration of a projectile device, the projectile device can readily dislodge from their support receivers while suitable impediment to dislodgement of the feet can be maintained during recoil of the projectile device. It can therefore be summarized by the disclosure of FIGS. 21-23 that if an opening of a support receiver can only partially accommodate a lower end portion of a support, there exists a definite height the support can be disposed within the support receiver.

FIG. 24 depicts one embodiment of a base 28 for supporting legs of a projectile device. Disclosed is a base 28 having a raised bar or curb 124. Again, there is a longitudinal position along the base 28 that is definite when a leg 24 is pushed against the curb 124. A support receiver may additionally be combined with the curb 124 to provide suitable resistance to recoils.

In one embodiment not shown, the lower end portion of a support may be configured concavely while its corresponding support receiver may be configured convexly, i.e., the coupling surfaces of the support and its corresponding support receiver are complementary surfaces of those disclosed in FIGS. 2-24.

FIG. 25 depicts one embodiment of a shooting rest where the front and rear legs of the shooting rest are supported on and removably coupled to a base. In this embodiment, an elastic member 130 is provided to prevent the recoil of the firearm 4 from causing the firearm to go out-of-range, e.g., off of the base 28 upon which the firearm is supported.

The elastic member 130 includes two ends. The first end of the elastic member 130 is configured to be removably attached to the firearm, e.g., with an attaching means having a magnetic material or a closure means having a hook and loop pair, to the trigger guard 140. Alternatively, the elastic member 130 may be attached to another portion of the firearm or the rear support, etc. If a magnetic material is used, a recoil that occurs more violently than expected may cause the elastic member 130 to detach from the firearm to prevent sudden retardation of the recoil that may jeopardize the shot which caused the recoil. If a magnetic material is used on the elastic member 130 and a complementary ferrous or magnetic material is unavailable on the firearm, a complementary material may be attached to the firearm, e.g., via adhesives. The first end may alternatively be secured to a firearm via a fastener, e.g., screw. In one embodiment, the second end of the elastic member is configured to be attached to the base 28, e.g., via a fastener 132, e.g., screw. It shall be noted that the cross-sectional profile of the channels 26 is essentially rectangular with the width of channel 26 smaller than the diameter of each corresponding cylindrical rod 22 or the rounded structures such that each rod 22 (as shown in the front support of FIGS. 25-27) or a rounded structure (as shown in the rear support of FIGS. 25-27) comes in contact with only the top edges of each channel (as depicted in FIGS. 21-22).

FIG. 26 depicts one embodiment of a shooting rest where the front and rear legs of the shooting rest are supported on and removably coupled to a base at their respective first ends and the rear legs are removably coupled to the heel plug 138 of a projectile device at a second end. Again, the cross-sectional profile of the channels 26 is essentially rectangular with the width of channel 26 smaller than the diameter of the corresponding cylindrical rod 22 at the front support and the diameter of the corresponding feet 36 or rounded structures at the rear support. It shall be noted that the rear support is attached to the heel plug 138 of the stock. The Applicant discovered that the heel plug of a stock provides an ideal spot for attaching a rear support. In this example, a Picatinny or Weaver rail or rail segment 84 is attached, e.g., via fasteners, e.g., screws, to the heel plug 138. The rear support is essentially a pair of legs (or bipod) capped at their lower end portions with feet 36. The upper end portion includes a rail bracket 86 having a pitch adjustment mechanism 104 with respect to the legs. As the rear-mounted bipod is mounted sufficiently forward on the stock to enable being folded rearward when not in use, it is a deterrent to becoming "snagged" when negotiating brush/terrain. If mounted too far rearward and folded backward in order to avoid snagging, it would then interfere with the proper shouldering position if spontaneous shooting is necessary. Therefore, in circumstances where the bipod is required to be stowed away, the ideal fastening/folding location is immediately behind and below the trigger, preferably molded into the same shape as the original heel plug beneath the trigger grip. FIG. 27 depicts one embodiment of a shooting rest where the rear legs are removably coupled to the heel plug 138 of a projectile device and the rear legs are configured to be stowable. It shall be noted that the pitch adjustment mechanism 104 allows the legs to be rotated rearwardly to be "out of the way" when the rear support is not in use. It shall also be noted that the elastic member 130 is also shown disconnected from the firearm. As depicted elsewhere herein, the front support may also be a pair of legs, each terminated at its lower end portion with a foot. Although the lower end portions of the front support are shown terminated with cylindrical rods in FIGS. 25-27, rounded structures as shown on the rear supports in FIGS. 25-27 may be readily used.

FIG. 28 depicts one embodiment of a shooting rest where the front and rear legs of a projectile device are removably coupled to grooves or channels 26 aligned substantially parallel to the direction of recoil of the projectile device. In this embodiment, the channels 26 themselves provide sufficient drag to dampen recoil without causing a sudden stop to the recoil, thereby not affecting the shot which causes the recoil. Further, a raised bar 136 is provided at the front end of the channels such that the firearm can be returned to its position prior to recoil by bringing the front support to a contacting engagement with the raised bar 136.

FIG. 29 depicts front views of one embodiment of a collapsible base in both its erected state as shown in the base 28 on the left and its collapsed state as shown in the base on the right. A collapsible base facilitates transport of the present apparatus as the size of the apparatus including a base can be minimized. In the embodiment shown, the base can be collapsed into a size half of its size when erected. The base is essentially made up of two mirrored portions connected medially via a hinge 142. In one embodiment, the hinge 142 is a plastic hinge. Other types of hinges are also applicable. In its collapsed state, the two portions of the base are essentially stacked with the two portions rotated such that their bottom surfaces come in contact with one another. In its erected state, the two portions are laid flat forming a larger surface with the opposing surfaces of the two portions coming into contact with one another. In one embodiment, in order to secure the two portions in its erected state, a magnetic material 134 is disposed within each of the abutting surfaces of the two portions. Other means for securing the base in its collapsed or erected state are also possible. The base can be made collapsible in the longitudinal or transverse direction relative to the firearm.

FIG. 30 depicts one embodiment of a shooting rest where the base of the shooting rest is removably coupled to a pitch and height-adjustable secondary support 144. This embodiment is useful for setting up and using the base 28 on uneven grounds. In this embodiment, the secondary support 144 includes a plurality of legs, e.g., four, individually height-adjustable legs 146, i.e., a pair in the front of the secondary support 144 and a pair in the rear of the secondary support 144. Pitch and/or height adjustments of the secondary support 144 are effected via the combination of adjustments made to one or more legs 146. In one instance, for each leg 146, adjustment knob 148 is used to release the leg so that a position adjustment can be made before the leg is again locked with the same adjustment knob 148. In one embodiment, a spike 150 is further disposed at the bottom of each leg 146 to allow each leg 146 to be better driven into and secured to the ground 46.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. An apparatus for supporting a firearm having a forestock, a stock and a central axis while allowing a recoil of the firearm to not be restricted and the firearm to be repeatably returned to the position the firearm was supported prior to the recoil, said apparatus comprising at least two supports, each having an upper end portion and a lower end portion that is opposingly disposed from said upper end portion, a base having a top surface having a profile, said base comprising at least one support receiver configured for removably engaging a support of said at least two supports at its lower end portion, wherein a first one of said at least two supports is configured to be removably coupled at its upper end portion to the forestock of the firearm and a second one of said at least two supports is configured to be removably coupled at its upper end portion to the stock of the firearm and said at least one support receiver comprises a channel having a width and a longitudinal axis, said channel is disposed on said top surface and said lower end portion of at least one of said at least two supports comprises a rounded structure configured to be removably supported in said channel, said rounded structure having a diameter that is larger than said width of said channel, wherein said channel is disposed such that said longitudinal axis of said channel is disposed substantially at right angle to the central axis of the firearm when each of said at least two supports is removably coupled to the firearm and said rounded structure of said at least one of said at least two supports is removably supported on said channel and whereby upon firing of the firearm, recoil occurs without restriction as one of said at least two supports disengages from said at least one support receiver and slides according to said profile of said top surface and the firearm is returnable to the position prior to the firing of the firearm by re-engaging said support of said at least two supports with said at least one support receiver.

2. The apparatus of claim 1, further comprising a secondary support having a plurality of height-adjustable legs extending from a bottom surface of said secondary support such that the base can be disposed atop a top surface of said secondary support that can be disposed at a desired height and pitch.

3. The apparatus of claim 1, wherein each of said at least two supports is adapted for attachment at its upper end portion to the firearm via a quick-release mechanism, wherein said upper end portion of said first one of said at least two supports is adapted for attachment to the forestock of the firearm and said upper end portion of said second one of said at least two supports is adapted for attachment to the stock of the firearm.

4. The apparatus of claim 1, wherein each of said at least two supports is adapted for attachment at its upper end portion to the firearm via a rail-bracket mechanism of a rail type selected from the group consisting of Picatinny and Weaver, wherein said upper end portion of said first one of said at least two supports is adapted for attachment to the forestock of the firearm and said upper end portion of said second one of said at least two supports is adapted for attachment to the stock of the firearm.

5. The apparatus of claim 1, wherein at least one of said at least two supports comprises a pair of legs.

6. The apparatus of claim 5, wherein each said leg is configured to be telescopic.

7. The apparatus of claim 1, wherein at least one of said at least two supports comprises a pivot disposed at said upper end portion, said pivot having an axis of rotation disposed substantially at right angle to the central axis of the firearm such that a rotation of said at least one of said at least two supports causes a pitch change of the firearm.

8. The apparatus of claim 1, wherein at least one of said at least two supports comprises a pair of legs configured to be spread-adjustable such that the stance and height of said at least one of said at least two supports are adjustable while the roll angle of said pair of legs is maintained.

9. The apparatus of claim 1, further comprising an elastic member having two ends, a first end of said elastic member is configured to be removably attached to the firearm and a second end of said elastic member is configured to be attached to said base, whereby said elastic member prevents the recoil of the firearm from causing the firearm to go out-of-range.

10. The apparatus of claim 9, wherein said first end of said elastic member comprises a magnetic material.

11. An apparatus for supporting a firearm having a forestock, a stock and a central axis while allowing a recoil of the firearm to not be restricted and the firearm to be repeatably returned to the position the firearm was supported prior to the recoil, said apparatus comprising at least two supports, each having an upper end portion and a lower end portion that is opposingly disposed from said upper end portion, a base having a top surface having a profile, said base comprising at least one support receiver configured for removably engaging a support of said at least two supports at its lower end portion, wherein a first one of said at least two supports is configured to be removably coupled at its upper end portion to the forestock of the firearm and a second one of said at least two supports is configured to be removably coupled at its upper end portion to the stock of the firearm, and said at least one support receiver comprises a channel having a longitudinal axis, a width and a front end, said channel is terminated at said front end of said channel with a raised bar that is disposed substantially at right angle to said channel, said channel is disposed on said top surface and said lower end portion of at least one of said at least two supports comprises a rounded structure to be removably supported in said channel, said rounded structure having a diameter that is larger than said width of said channel, wherein said channel is disposed such that said longitudinal axis of said channel is disposed substantially parallel to the central axis of the firearm when each of said at least two supports is removably coupled to the firearm and said rounded structure of said at least one of said at least two supports is removably supported on said channel and whereby upon firing of the firearm, recoil occurs without restriction as one of said at least two supports slides along said channel and the firearm is returnable to the position prior to the firing of the firearm by re-engaging said support of said at least two supports with said raised bar and said channel.

12. The apparatus of claim 11, further comprising a secondary support having a plurality of height-adjustable legs extending from a bottom surface of said secondary support such that the base can be disposed atop a top surface of said secondary support that can be disposed at a desired height and pitch.

13. The apparatus of claim 11, wherein each of said at least two supports is adapted for attachment at its upper end portion to the firearm via a quick-release mechanism, wherein said upper end portion of said first one of said at least two supports is adapted for attachment to the forestock of the firearm and said upper end portion of said second one of said at least two supports is adapted for attachment to the stock of the firearm.

14. The apparatus of claim 11, wherein each of said at least two supports is adapted for attachment at its upper end portion to the firearm via a rail-bracket mechanism of a rail type selected from the group consisting of Picatinny and Weaver, wherein said upper end portion of said first one of said at least two supports is adapted for attachment to the forestock of the firearm and said upper end portion of said second one of said at least two supports is adapted for attachment to the stock of the firearm.

15. The apparatus of claim 11, wherein at least one of said at least two supports comprises a pair of legs.

16. The apparatus of claim 15, wherein each said leg is configured to be telescopic.

17. The apparatus of claim 11, wherein at least one of said at least two supports comprises a pivot disposed at said upper end portion, said pivot having an axis of rotation disposed substantially at right angle to the central axis of the firearm such that a rotation of said at least one of said at least two supports causes a pitch change of the firearm.

18. The apparatus of claim 11, wherein at least one of said at least two supports comprises a pair of legs configured to be spread-adjustable such that the stance and height of said at least one of said at least two supports are adjustable while the roll angle of said pair of legs is maintained.

19. The apparatus of claim 11, further comprising an elastic member having two ends, a first end of said elastic member is configured to be removably attached to the firearm and a second end of said elastic member is configured to be attached to said base, whereby said elastic member prevents the recoil of the firearm from causing the firearm to go out-of-range.

20. The apparatus of claim 19, wherein said first end of said elastic member comprises a magnetic material.

* * * * *